(12) United States Patent
Imakubo

(10) Patent No.: US 11,521,315 B2
(45) Date of Patent: Dec. 6, 2022

(54) FLUORESCENCE IMAGE ANALYZER AND FLUORESCENCE IMAGE ANALYZING METHOD

(71) Applicant: SYSMEX CORPORATION, Kobe (JP)

(72) Inventor: Momoko Imakubo, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 21 days.

(21) Appl. No.: 16/831,168

(22) Filed: Mar. 26, 2020

(65) Prior Publication Data
US 2020/0311927 A1 Oct. 1, 2020

(30) Foreign Application Priority Data
Mar. 29, 2019 (JP) .............................. JP2019-065690

(51) Int. Cl.
*G06T 7/00* (2017.01)
*G01N 21/64* (2006.01)
*G06T 11/60* (2006.01)

(52) U.S. Cl.
CPC ....... *G06T 7/0012* (2013.01); *G01N 21/6456* (2013.01); *G01N 21/6486* (2013.01);
(Continued)

(58) Field of Classification Search
CPC ... G06T 7/0012; G06T 11/60; G06T 2200/24; G06T 2207/10064; G06T 2207/30024;
(Continued)

(56) References Cited

U.S. PATENT DOCUMENTS

| 11,085,880 B2 | 8/2021 | Yamada et al. |
| 2002/0146734 A1 | 10/2002 | Ortyn et al. |

(Continued)

FOREIGN PATENT DOCUMENTS

| CN | 101529227 | 9/2009 |
| CN | 105492887 | 4/2016 |

(Continued)

OTHER PUBLICATIONS

The extended European search report dated Jun. 22, 2020 in a counterpart European patent application No. 20165851.5.
(Continued)

*Primary Examiner* — Jon Chang
(74) *Attorney, Agent, or Firm* — Crowell & Moring LLP

(57) ABSTRACT

Disclosed is a fluorescence image analyzer for measuring and analyzing a sample that includes a plurality of cells in which target portions are labeled with fluorescent dyes, and the fluorescence image analyzer includes a light source configured to apply light to the sample; an imaging unit configured to take a fluorescence image of each of the cells by which fluorescence is generated by applying the light; a processing unit configured to process the fluorescence image having been taken; and a display unit. The processing unit obtains a bright point pattern of fluorescence in the fluorescence image, causes the display unit to display a plurality of positive patterns that are previously associated with at least one of a measurement item or a labeling reagent, and causes the display unit to display information of at least one of the number of abnormal cells included in the sample, a proportion of the number of the abnormal cells, the number of normal cells included in the sample, and a proportion of the normal cells, based on the bright point pattern having been obtained and the plurality of positive patterns.

21 Claims, 16 Drawing Sheets

(52) U.S. Cl.
CPC .......... *G06T 11/60* (2013.01); *G06T 2200/24* (2013.01); *G06T 2207/10064* (2013.01); *G06T 2207/30024* (2013.01); *G06T 2207/30242* (2013.01)

(58) Field of Classification Search
CPC ............. G06T 2207/30242; G06T 7/90; G06T 2207/10056; G01N 21/6456; G01N 21/6486; G01N 2021/6419; G01N 2021/6441; C12Q 1/6841
See application file for complete search history.

(56) References Cited

U.S. PATENT DOCUMENTS

| | | | |
|---|---|---|---|
| 2012/0163681 | A1 | 6/2012 | Lohse |
| 2014/0072195 | A1 | 3/2014 | Zhang et al. |
| 2014/0205173 | A1 | 7/2014 | Padfield et al. |
| 2015/0049936 | A1 | 2/2015 | Tsunomori et al. |
| 2016/0042507 | A1 | 2/2016 | Turner |
| 2017/0343475 | A1* | 11/2017 | Yamada .............. G01N 21/6456 |
| 2018/0299382 | A1* | 10/2018 | Yamada .............. G01N 21/6458 |
| 2019/0049379 | A1 | 2/2019 | Konishi et al. |

FOREIGN PATENT DOCUMENTS

| | | |
|---|---|---|
| CN | 106501227 | 3/2017 |
| EP | 3054279 A1 | 8/2016 |
| EP | 3388820 A1 | 10/2018 |
| JP | 2005-515408 | 5/2005 |
| JP | 2008-518587 | 6/2008 |
| JP | 2016-507229 | 3/2016 |
| JP | 2016-164540 | 9/2016 |
| JP | 6231709 | 11/2017 |
| KR | 2008-0063280 | 7/2008 |
| WO | WO 02/093130 | 11/2002 |
| WO | WO 2006/036735 | 4/2006 |
| WO | WO 2012/075028 | 6/2012 |
| WO | WO 2013/146841 | 10/2013 |
| WO | WO 2016/152244 | 9/2016 |

OTHER PUBLICATIONS

Qinghua et al., "Calibration of Interphase Fluorescence in Situ Hybridization Cutoff by Mathematical Models: Calibration of Interphase FISH Cutoff by Mathematical Models," Cytometry. Part A, vol. 89, No. 3, Nov. 18, 2015, pp. 239-245.

Siu et al., "Application of tri-colour, dual fusion fluorescence in situ hybridization (FISH) system for the characterization of BCR-ABLI fusion in chronic myelogenous leukaemia (CML) and residual disease monitoring," BMC Blood Disorders, Biomed Central Ltd., vol. 9, No. 4, Jul. 7, 2009, pp. 1-6, London, GB.

Pajor et al., "State-of-the-art FISHing: Automated Analysis of Cytogenetic Aberrations in Interphase Nuclei," Cytometry. Part A, vol. 81A, No. 8, Jun. 13, 2012, pp. 649-663.

Communication pursuant to Article 94(3) EPC dated Apr. 21, 2020 in a counterpart European patent application No. 18166771.8.

Qinghua Du, et al., "Calibration of Interphase Fluorescence in Situ Hybridization Cutoff by Mathematical Models", Cytometry Part A, vol. 89A, 2016, pp. 239-245.

Japanese Office Action dated Dec. 8, 2020 in a counterpart Japanese patent application No. 2017-080855.

Japanese Office Action dated Feb. 2, 2021 in a counterpart Japanese patent application No. 2019-029231.

Japanese Office Action dated May 11, 2021 in a counterpart Japanese patent application No. 2017-080855.

Chinese Office Action dated May 28, 2021 in a counterpart Chinese patent application No. 201810323180.5.

Extended European Search Report in Europe Application No. 18166771.8, dated Jun. 21, 2018, 11 pages.

European Patent Office Examination Report dated Oct. 10, 2022, pp. 1-4, in European patent application No. 20165851.5, European Patent Office, Munich, Germany.

* cited by examiner

FIG. 4A

| MEASUREMENT ITEM | BCR-ABL ▼ |
| PROBE NAME | ES ▼ |

NEXT — SC1

FIG. 4B

SC3 — REGISTERED POSITIVE PATTERN — BT

DISPLAY ALL PATTERNS

| TYPICAL PATTERN | G1R2F1 | ✔ |
| MINOR PATTERN | G1R1F2 | |
| 9q DELETION PATTERN | G2R1F1 | ✔ |
| 9q · 22q DELETION PATTERN | G1R1F1 | |

FIG. 6

| | | RC1 |
|---|---|---|
| MEASUREMENT ITEM | BCR-ABL | |
| PROBE NAME | ES | |

| NEGATIVE PATTERN NAME | BRIGHT POINT INFORMATION |
|---|---|
| NEGATIVE PATTERN | G2R2F0 |

| POSITIVE PATTERN NAME | BRIGHT POINT INFORMATION |
|---|---|
| MINOR PATTERN | G1R1F2 |
| 9q DELETION PATTERN | G2R1F1 |
| 9q22q DELETION PATTERN | G1R1F1 |
| ⋮ | |

[REGISTER]

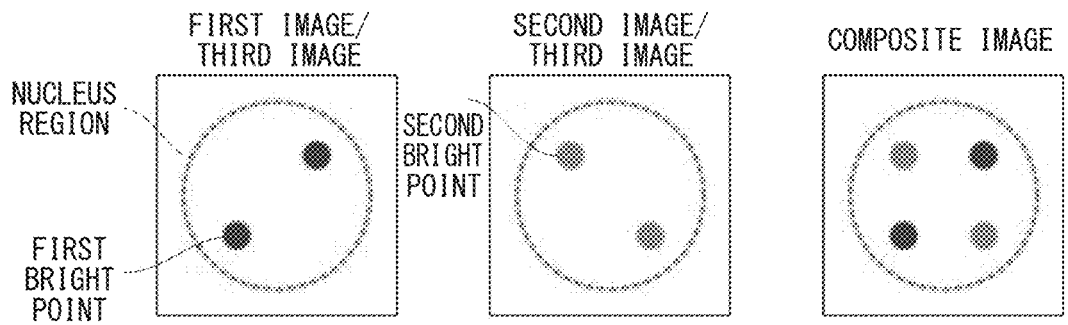
FIG. 7A NEGATIVE PATTERN
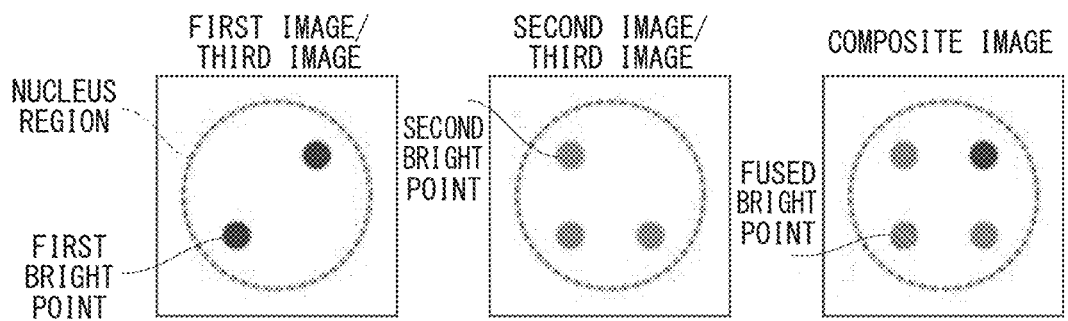
FIG. 7B POSITIVE PATTERN 1
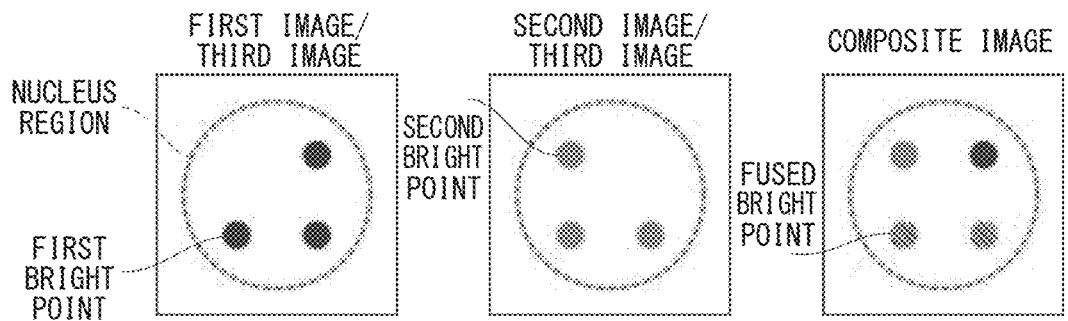
FIG. 7C POSITIVE PATTERN 2
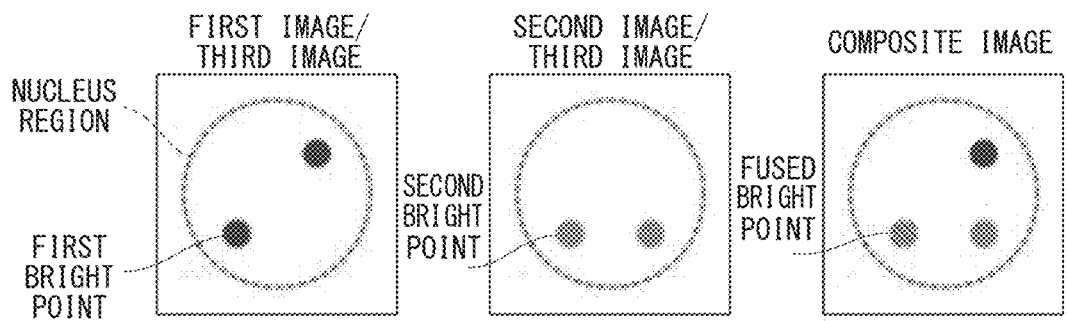
FIG. 7D POSITIVE PATTERN 3

FIG. 8A
EXAMPLE OF BCR/ABL PROBE
A: ES PROBE
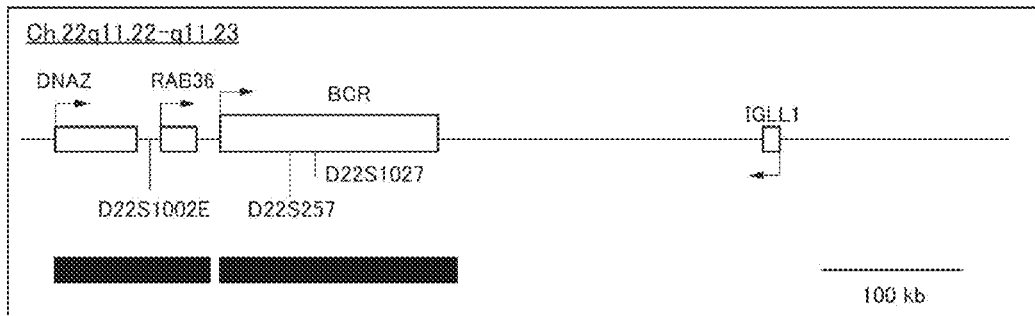
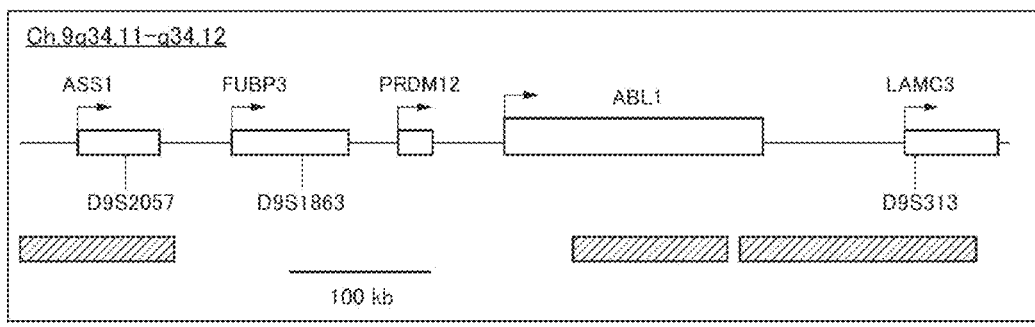
PORTION BOUND TO PROBE THAT IS LABELED WITH FIRST FLUORESCENCE
PORTION BOUND TO PROBE THAT IS LABELED WITH SECOND FLUORESCENCE
FIG. 8B
B: DF PROBE
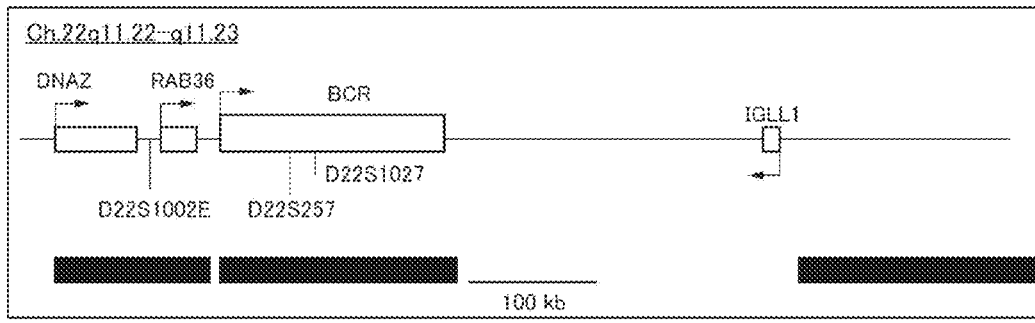
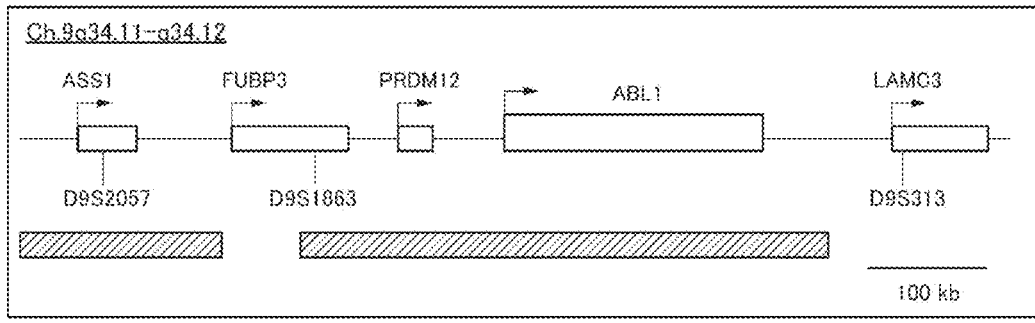
PORTION BOUND TO PROBE THAT IS LABELED WITH FIRST FLUORESCENCE
PORTION BOUND TO PROBE THAT IS LABELED WITH SECOND FLUORESCENCE

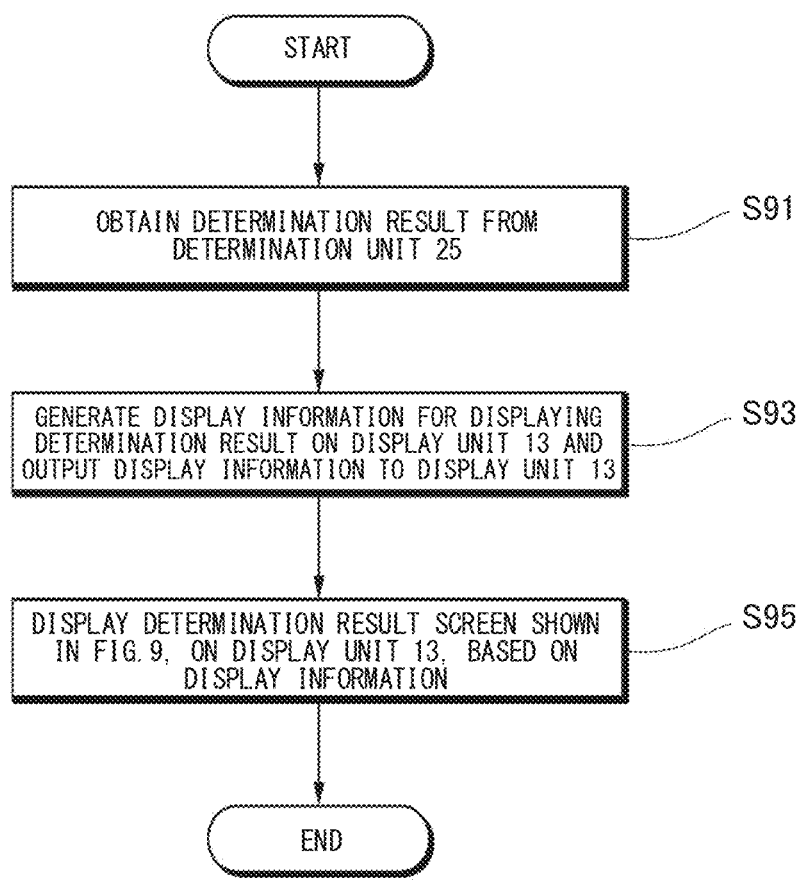

FLUORESCENCE IMAGE ANALYZER AND FLUORESCENCE IMAGE ANALYZING METHOD

RELATED APPLICATIONS

This application claims priority to Japanese Patent Application No. 2019-065690, filed on Mar. 29, 2019, the entire content of which is incorporated herein by reference.

BACKGROUND OF THE INVENTION

1. Field of the Invention

The present invention relates to a fluorescence image analyzer and a fluorescence image analyzing method.

2. Description of the Related Art

Japanese Patent Publication 2005-515408 discloses a cell processing method in which a flow cytometer or the like is applied to detection by a fluorescence in situ hybridization (FISH method). In the FISH method, a cell is stained in preprocessing in which a labeled probe is hybridized to a DNA sequence region to be detected in a cell. Fluorescence generated by the labeled probe is detected, thereby detecting an abnormal cell.

In the above-described analyzing method for analyzing an abnormal cell, positive patterns include typical positive patterns and atypical positive patterns. Furthermore, the atypical positive patterns may also include another positive pattern that occurs due to chromosomal abnormality such as deletion of a chromosome. An operator needs to determine what positive pattern, among a plurality of positive patterns, corresponds to each cell in the sample without omission in order to accurately determine whether the sample is positive or negative for a certain disease. Therefore, if a determination omission occurs in the above-described analyzing method, accuracy for determining whether or not each cell is abnormal may be degraded.

SUMMARY OF THE INVENTION

The scope of the present invention is defined solely by the appended claims, and is not affected to any degree by the statements within this summary.

As shown in FIGS. 1, 3, 4A, 4B, and 7A to 7D, a fluorescence image analyzer (1) according to one aspect of the present invention is directed to a fluorescence image analyzer for measuring and analyzing a sample (10) that includes a plurality of cells in which target portions are labeled with fluorescent dyes. The fluorescence image analyzer includes a light source (120 to 123) configured to apply light to the sample (10); an imaging unit (160) configured to take a fluorescence image of each of the cells by which fluorescence is generated by applying the light; a processing unit (11) configured to process the fluorescence image having been taken; and a display unit (13). The processing unit (11) obtains a bright point pattern of fluorescence in the fluorescence image, causes the display unit (13) to display a plurality of positive patterns that are previously associated with at least one of a measurement item or a labeling reagent, and causes the display unit (13) to display information of at least one of the number of abnormal cells included in the sample (10), a proportion of the number of the abnormal cells, the number of normal cells included in the sample (10), or a proportion of the normal cells, based on the bright point pattern having been obtained and the plurality of positive patterns.

According to the above-described aspect, the fluorescence image analyzer (1) obtains a bright point pattern of fluorescence in the fluorescence image, causes the display unit (13) to display a plurality of positive patterns that are previously associated with at least one of a measurement item or a labeling reagent, and causes the display unit (13) to display information of at least one of the number of abnormal cells included in the sample (10), a proportion of the number of the abnormal cells, the number of normal cells included in the sample (10), or a proportion of the normal cells, based on the bright point pattern having been obtained and the plurality of positive patterns. Therefore, what positive pattern, among a plurality of positive patterns, corresponds to a cell included in the sample (10) can be inhibited from being undetermined. Accordingly, accuracy for determining whether the sample (10) is positive or negative can be improved. Furthermore, a user is allowed to easily recognize information of at least one of the number of abnormal cells included in the sample (10), a proportion of the abnormal cells, the number of normal cells included in the sample (10), or a proportion of the normal cells.

As shown in FIGS. 1, 3, and 4A and 4B, in the fluorescence image analyzer (1), the processing unit (11) may cause the display unit (13) to display all of the plurality of positive patterns that are previously associated with at least one of the measurement item or the labeling reagent such that the positive patterns can be selected.

According to the above-described aspect, the processing unit (11) causes the display unit (13) to display all of the plurality of positive patterns that are previously associated with at least one of the measurement item or the labeling reagent such that the positive patterns can be selected. Therefore, what positive pattern, among a plurality of positive patterns, corresponds to a cell included in the sample 10 is likely to be inhibited from being undetermined. Accordingly, accuracy for determining whether the sample 10 is positive or negative can be further improved.

As shown in FIGS. 1, 3, and 4B, in the fluorescence image analyzer (1), the processing unit (11) may cause the display unit (13) to display the plurality of positive patterns that are previously associated with at least one of the measurement item or the labeling reagent, and check boxes located so as to correspond to the plurality of positive patterns, respectively.

According to the above-described aspect, the processing unit (11) causes the display unit (13) to display the plurality of positive patterns that are previously associated with at least one of the measurement item or the labeling reagent, and check boxes located so as to correspond to the plurality of positive patterns, respectively. Therefore, each of the plurality of positive patterns that are previously associated with at least one of the measurement item or the labeling reagent can be selected in a check box method. Accordingly, an operator is allowed to easily perform an operation of selecting the positive pattern.

As shown in FIGS. 4A and 4B, in the fluorescence image analyzer (1), the processing unit (11) may manage, for each user, an authority to operate a selection screen that allows selection from among the plurality of positive patterns, and may cause the display unit (13) to display the selection screen corresponding to a specific user having the authority.

According to the above-described aspect, the processing unit (11) manages, for each user, an authority to operate a selection screen that allows selection from among the plurality of positive patterns, and causes the display unit (13) to display the selection screen corresponding to a specific user having the authority. Therefore, the authorized specific user is allowed to operate the selection screen corresponding to the specific user. Accordingly, another user can be prohibited from operating the selection screen and changing the positive pattern which has been desirably set by the specific user without permission.

As shown in FIGS. 1 and 9, the fluorescence image analyzer (1) may further include a storage unit (12) configured to store determination results for the sample (10), and the processing unit (11) may cause the display unit (13) to display all the determination results having been stored.

According to the above-described aspect, the processing unit (11) causes the display unit (13) to display all the determination results having been stored. What positive pattern, among a plurality of positive patterns, corresponds to a cell included in the sample 10 can be likely to be inhibited from being undetermined. Accordingly, accuracy for determining whether the sample 10 is positive or negative can be further improved.

As shown in FIGS. 9 and 10, in the fluorescence image analyzer (1), the processing unit (11) may cause the display unit (13) to display information of at least one of the number of the abnormal cells included in the sample (10), a proportion of the abnormal cells, the number of the normal cells included in the sample (10), or a proportion of the normal cells, together with fluorescence images of cells included in the sample (10).

According to the above-described aspect, the processing unit (11) causes the display unit (13) to display the information of at least one of the number of abnormal cells included in the sample (10), a proportion of the abnormal cells, the number of normal cells included in the sample (10), or a proportion of the normal cells, together with fluorescence images of cells included in the sample (10). Therefore, a user is allowed to confirm information of at least one of the number of abnormal cells included in the sample (10), the proportion of the abnormal cells, the number of normal cells included in the sample (10), or the proportion of the normal cells, together with the fluorescence images of the cells included in the sample (10).

As shown in FIGS. 9 and 10, in the fluorescence image analyzer (1), the processing unit (11) may cause the display unit (13) to display a graph image indicating at least one of a proportion of the abnormal cells included in the sample (10) or a proportion of the normal cells included in the sample (10), together with text information indicating at least one of the proportion of the abnormal cells or the proportion of the normal cells.

According to the above-described aspect, the processing unit (11) causes the display unit (13) to display a graph image indicating at least one of a proportion of abnormal cells included in the sample (10) or a proportion of normal cells included in the sample (10), together with text information indicating at least one of the proportion of the abnormal cells or the proportion of the normal cells. Therefore, a user is allowed to confirm the text information indicating at least one of the proportion of abnormal cells included in the sample (10) or the proportion of normal cells included in the sample (10), together with the graph image.

As shown in FIGS. 9 and 10, in the fluorescence image analyzer (1), the processing unit (11) may cause the display unit (13) to display a determination result regarding a positive pattern for which the number of the abnormal cells included in the sample (10) is greatest, or the proportion of the abnormal cells included in the sample (10) is greatest, in a display manner different from that for a determination result regarding another positive pattern.

According to the above-described aspect, the processing unit (11) causes the display unit (13) to display the determination result regarding a positive pattern for which the number of abnormal cells included in the sample (10) is greatest, or the proportion of abnormal cells included in the sample (10) is greatest, in a display manner different from that for the determination result regarding another positive pattern. Therefore, a user is allowed to more easily recognize the determination result regarding the positive pattern for which the number of abnormal cells or the proportion of abnormal cells is greatest, on the determination result screen including various determination results.

As shown in FIGS. 7A to 7D, in the fluorescence image analyzer (1), the plurality of positive patterns that are previously associated with at least one of the measurement item or the labeling reagent may be determined based on colors and the number of bright points of florescence generated from the fluorescent dyes with which the target portions are labelled.

As shown in FIGS. 1, 3, 4A, 4B, and 7A to 7D, a fluorescence image analyzing method according to one aspect of the present invention is directed to a fluorescence image analyzing method for measuring and analyzing a sample (10) that includes a plurality of cells in which target portions are labeled with fluorescent dyes. The fluorescence image analyzing method includes taking a fluorescence image of each of the cells by which fluorescence is generated by light being applied to the sample (10) from a light source; and processing the fluorescence image having been taken. The processing includes obtaining a bright point pattern of fluorescence in the fluorescence image, causing a display unit (13) to display a plurality of positive patterns that are previously associated with at least one of a measurement item or a labeling reagent, and causing the display unit (13) to display information of at least one of the number of abnormal cells included in the sample (10), a proportion of the number of the abnormal cells, the number of normal cells included in the sample (10), or a proportion of the normal cells, based on the bright point pattern having been obtained and the plurality of positive patterns.

According to the above-described aspect, the processing includes obtaining a bright point pattern of fluorescence in the fluorescence image; causing the display unit (13) to display a plurality of positive patterns that are previously associated with at least one of a measurement item or a labeling reagent; and causing the display unit (13) to display information of at least one of the number of abnormal cells included in the sample (10), a proportion of the number of the abnormal cells, the number of normal cells included in the sample (10), or a proportion of the normal cells, based on the bright point pattern having been obtained and the plurality of positive patterns. Therefore, what positive pattern, among a plurality of positive patterns, corresponds to a cell included in the sample (10) can be inhibited from being undetermined. Accordingly, accuracy for determining whether the sample (10) is positive or negative can be improved. Furthermore, a user is allowed to easily recognize information of at least one of the number of abnormal cells included in the sample (10), a proportion of the abnormal cells, the number of normal cells included in the sample (10), or a proportion of the normal cells.

As shown in FIGS. 1, 3, and 4A and 4B, in the fluorescence image analyzing method, the processing may include causing the display unit (13) to display all of the plurality of positive patterns that are previously associated with at least one of the measurement item or the labeling reagent such that the positive patterns can be selected.

According to the above-described aspect, in the processing, the display unit (13) is caused to display all of the plurality of positive patterns that are previously associated with at least one of the measurement item or the labeling reagent such that the positive patterns can be selected. Therefore, what positive pattern, among a plurality of positive patterns, corresponds to a cell included in the sample 10 is likely to be inhibited from being undetermined. Thus, accuracy for determining whether the sample 10 is positive or negative can be further improved.

As shown in FIGS. 1, 3, and 4B, in the fluorescence image analyzing method, the processing may include causing the display unit (13) to display the plurality of positive patterns that are previously associated with at least one of the measurement item or the labeling reagent, and check boxes located so as to correspond to the plurality of positive patterns, respectively.

According to the above-described aspect, in the processing, the display unit (13) is caused to display the plurality of positive patterns that are previously associated with at least one of the measurement item or the labeling reagent, and check boxes located so as to correspond to the plurality of positive patterns, respectively. Therefore, each of the plurality of positive patterns that are previously associated with at least one of the measurement item or the labeling reagent can be selected in a check box method. Accordingly, an operator is allowed to easily perform an operation of selecting the positive pattern.

As shown in FIGS. 4A and 4B, in the fluorescence image analyzing method, the processing may include managing, for each user, an authority to operate a selection screen that allows selection from among the plurality of positive patterns; and causing the display unit (13) to display the selection screen corresponding to a specific user having the authority.

According to the above-described aspect, in the processing, an authority to operate a selection screen that allows selection from among the plurality of positive patterns is managed for each user, and the display unit (13) is caused to display the selection screen corresponding to a specific user having the authority. Therefore, the authorized specific user is allowed to operate the selection screen corresponding to the specific user. Accordingly, another user can be prohibited from operating the selection screen and changing the positive pattern which has been desirably set by the specific user without permission.

As shown in FIGS. 1, 9 and 11, the fluorescence image analyzing method may further include storing determination results for the sample (10), and the processing may include causing the display unit (13) to display all the determination results having been stored.

According to the above-described aspect, in the processing, the display unit (13) is caused to display all the determination results having been stored. What positive pattern, among a plurality of positive patterns, corresponds to a cell included in the sample (10) can be likely to be inhibited from being undetermined. Accordingly, accuracy for determining whether the sample (10) is positive or negative can be further improved.

As shown in FIGS. 9 to 11, in the fluorescence image analyzing method, the processing may include causing the display unit (13) to display information of at least one of the number of the abnormal cells included in the sample, a proportion of the abnormal cells, the number of the normal cells included in the sample (10), or a proportion of the normal cells, together with fluorescence images of cells included in the sample (10).

According to the above-described aspect, in the processing, the display unit (13) is caused to display the information of at least one of the number of abnormal cells included in the sample (10), a proportion of the abnormal cells, the number of normal cells included in the sample (10), or a proportion of the normal cells, together with fluorescence images of cells included in the sample (10). Therefore, a user is allowed to confirm information of at least one of the number of abnormal cells included in the sample (10), the proportion of the abnormal cells, the number of normal cells included in the sample (10), or the proportion of the normal cells, together with the fluorescence images of the cells included in the sample (10).

As shown in FIGS. 9 to 11, in the fluorescence image analyzing method, the processing may include causing the display unit (13) to display a graph image indicating at least one of a proportion of the abnormal cells included in the sample (10) or a proportion of the normal cells included in the sample (10), together with text information indicating at least one of the proportion of the abnormal cells or the proportion of the normal cells.

According to the above-described aspect, in the processing, the display unit (13) is caused to display a graph image indicating at least one of a proportion of abnormal cells included in the sample (10) or a proportion of normal cells included in the sample (10), together with text information indicating at least one of the proportion of the abnormal cells or the proportion of the normal cells. Therefore, a user is allowed to confirm the text information indicating at least one of the proportion of abnormal cells included in the sample (10) or the proportion of normal cells included in the sample (10), together with the graph image.

As shown in FIGS. 9 to 11, in the fluorescence image analyzing method, the processing may include causing the display unit (13) to display a determination result regarding a positive pattern for which the number of the abnormal cells included in the sample (10) is greatest, or a proportion of the abnormal cells included in the sample (10) is greatest, in a display manner different from that for a determination result regarding another positive pattern.

According to the above-described aspect, in the processing, the display unit (13) is caused to display the determination result regarding a positive pattern for which the number of abnormal cells included in the sample (10) is greatest, or the proportion of abnormal cells included in the sample (10) is greatest, in a display manner different from that for the determination result regarding another positive pattern. Therefore, a user is allowed to more easily recognize the determination result regarding the positive pattern for which the number of abnormal cells or the proportion of abnormal cells is greatest, on the determination result screen including various determination results.

As shown in FIGS. 7A to 7B, in the fluorescence image analyzing method, the plurality of positive patterns that are previously associated with at least one of the measurement item or the labeling reagent may be determined based on colors and the number of bright points of florescence generated from the fluorescent dyes with which the target portions are labelled.

According to the present invention, accuracy for determining whether a sample is positive or negative can be improved.

BRIEF DESCRIPTION OF THE DRAWINGS

FIG. 4A illustrates one example of a specifying screen for specifying a measurement item and a labeling reagent in a display unit of the fluorescence image analyzer according to the embodiment;

FIG. 4B illustrates one example of a positive pattern selection screen in the display unit of the fluorescence image analyzer according to the embodiment;

FIG. 6 illustrates one example of a registration screen for registering information regarding a bright point pattern in the display unit of the fluorescence image analyzer according to the embodiment;

FIGS. 7A to 7D schematically illustrate examples of arrangements of bright points in a negative pattern, a positive pattern 1, a positive pattern 2, and a positive pattern 3, respectively, according to the embodiment;

FIG. 8A and FIG. 8B each illustrate an example of target portions to be hybridized to a probe of which the target is a BCR/ABL fusion gene according to the embodiment;

FIG. 16 is a flow chart showing one example of a display control process performed by the processing unit of the fluorescence image analyzer, according to the embodiment.

DETAILED DESCRIPTION OF THE PREFERRED EMBODIMENTS

Figure 1:
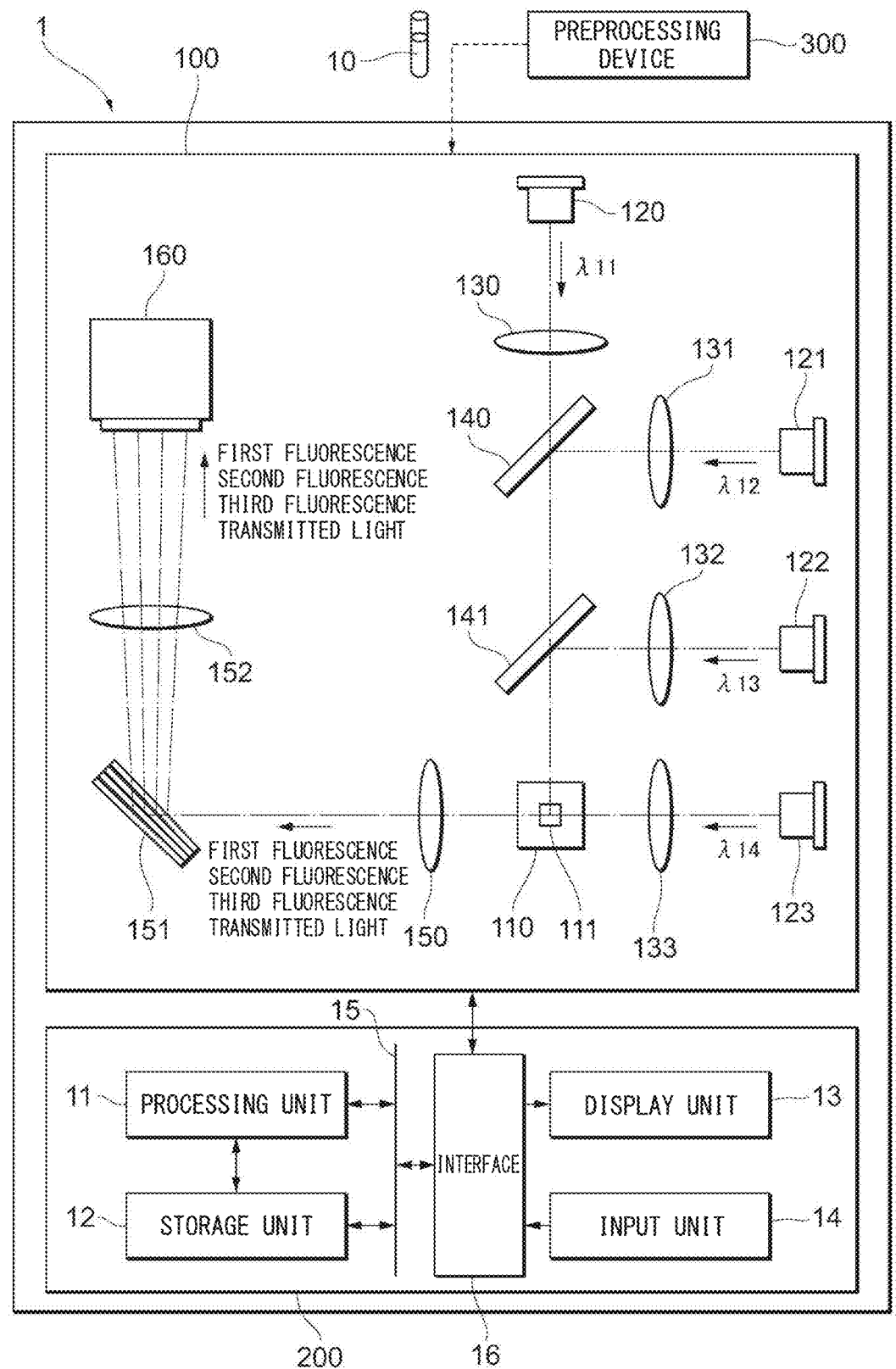
FIG. 1 is a perspective view of one example of configurations of a fluorescence image analyzer and a preprocessing device according to an embodiment.

A preferable embodiment of the present disclosure will be described below with reference to the drawings. The same components are denoted by the same reference characters, and repeated description thereof is omitted. Unless otherwise specified, the positional relationship among upper, lower, left, right, and the like are based on the positional relationship shown in the drawings. Furthermore, the dimensional proportions in the drawings are not limited to the proportions shown therein. The embodiment described below is illustrative merely for describing the present disclosure, and the present disclosure is not limited to the embodiment.

The present disclosure is applied to an apparatus for measuring and analyzing a sample prepared in preprocessing that includes hybridizing a nucleic acid probe labeled with a fluorescent dye, with a target portion in a nucleic acid, as the embodiment described below. Specifically, in the embodiment described below, the target portions in the nucleic acid are BCR gene on chromosome 22 and ABL gene on chromosome 9, and a cell in which translocation occurs between chromosome 9 and chromosome 22 as is observed in chronic myeloid leukemia is detected as an abnormal cell based on the FISH method. That is, in the embodiment described below, for example, a cell in which BCR-ABL fusion gene is generated due to the translocation of BCR gene or ABL gene is detected as the abnormal cell.

FIG. 1 illustrates a schematic configuration of a fluorescence image analyzer 1 according to the present embodiment. The fluorescence image analyzer 1 shown in FIG. 1 includes, for example, a measurement device 100 and a processing device 200, and measures and analyzes a sample 10 prepared in the preprocessing by a preprocessing device 300. An operator (user) collects nucleated cells that are cells to be measured by, for example, centrifuging a blood specimen collected from a subject with the use of, for example, a cell separation medium such as Ficoll. When the nucleated cells are collected, red blood cells or the like may be hemolyzed by using a hemolyzing agent to leave nucleated cells instead of the nucleated cells being collected by centrifugation.

The preprocessing device 300 includes, for example, a mixing container in which a reagent and a nucleated cell suspension obtained by centrifugation or the like are mixed, a dispensing unit for dispensing the nucleated cell suspension and the reagent into the mixing container, and a heating unit for heating the mixing container. The preprocessing device 300 prepares the sample 10 in preprocessing that includes, for example, labeling the target portion in the cell collected from a subject, with a fluorescent dye, and staining the nucleus in the cell by a nucleus staining dye. Specifically, in labeling the target portion with a fluorescent dye, a target sequence is hybridized to a probe that is labeled with a fluorescent dye and that includes a nucleic acid sequence having a sequence complementary to the target sequence.

In the FISH method, the target portions on chromosomes are detected by using one or more fluorescent dyes. Preferably, in the FISH method, a target portion on a first chromosome and a target portion on a second chromosome are detected by using two or more fluorescent dyes ("first" and "second" that modify "chromosome" do not represent chromosome numbers but represent a comprehensive numerical concept). For example, a probe to be hybridized with BCR gene locus is formed such that a nucleic acid having a sequence complementary to a base sequence in the BCR gene locus is labeled with a first fluorescent dye that generates a first fluorescence having a wavelength $\lambda 21$ by light having a wavelength $\lambda 11$ being applied. By using this probe, the BCR gene locus is labeled with the first fluorescent dye. A probe to be hybridized with ABL gene locus is formed such that a nucleic acid having a sequence complementary to a base sequence in the ABL gene locus is labeled with a second fluorescent dye that generates a second fluorescence having a wavelength $\lambda 22$ by light having a wavelength $\lambda 12$ being applied. By using this probe, the ABL gene locus is labeled with the second fluorescent dye. The nucleus is stained by a nucleus staining dye that generates a third fluorescence having a wavelength $\lambda 23$ by light having a wavelength $\lambda 13$ being applied. Light having the wavelength $\lambda 11$, light having the wavelength $\lambda 12$, and light having the wavelength $\lambda 13$ are each so-called excitation light.

Specifically, the preprocessing device 300 performs, for example, a process of fixing a cell such that the cell does not contract by dehydration, a membrane permeating process of forming, in a cell, a hole having such a size as to introduce the probe into the cell, a thermal denaturing process of heating a cell, a process of hybridizing a probe with a target portion, a washing process of removing an unnecessary probe from the cell, and a process of staining a nucleus.

The measurement device 100 includes, for example, a flow cell 110, light sources 120 to 123, condenser lenses 130 to 133, dichroic mirrors 140 to 141, a condenser lens 150, an optical unit 151, a condenser lens 152, and an imaging unit 160. The sample 10 flows through a flow path 111 of the flow cell 110.

The light sources 120 to 123 apply light to the sample 10 that flows through the flow cell 110. The light sources 120 to 123 are each implemented by, for example, a semiconductor laser light source. The light sources 120 to 123 emit lights having the wavelengths $\lambda 11$ to $\lambda 14$, respectively.

The condenser lenses 130 to 133 condense lights, having the wavelengths $\lambda 11$ to $\lambda 14$, which are emitted from the light sources 120 to 123, respectively. The dichroic mirror 140 allows the light having the wavelength $\lambda 11$ to be transmitted therethrough and refracts the light having the wavelength $\lambda 12$. The dichroic mirror 141 allows the lights having the wavelengths $\lambda 11$ and $\lambda 12$ to be transmitted therethrough and refracts the light having the wavelength $\lambda 13$. Thus, the lights having the wavelengths $\lambda 11$ to $\lambda 14$ are applied to the sample 10 that flows through the flow path 111 of the flow cell 110. The number of the semiconductor laser light sources included in the measurement device 100 is not particularly limited as long as the number of the semiconductor laser light sources is not less than one. The number of the semiconductor laser light sources can be selected from among, for example, 1, 2, 3, 4, 5, and 6.

When the lights having the wavelengths $\lambda 11$ to $\lambda 13$ are applied to the sample 10 that flows through the flow cell 110, fluorescences are generated from fluorescent dyes by which the cell is stained. For example, when the light having the wavelength $\lambda 11$ is applied to the first fluorescent dye with which the BCR gene locus is labeled, the first fluorescence having the wavelength $\lambda 21$ is generated from the first fluorescent dye. When the light having the wavelength $\lambda 12$ is applied to the second fluorescent dye with which the ABL gene locus is labeled, the second fluorescence having the wavelength $\lambda 22$ is generated from the second fluorescent dye. When the light having the wavelength $\lambda 13$ is applied to the nucleus staining dye by which the nucleus is stained, the third fluorescence having the wavelength $\lambda 23$ is generated from the nucleus staining dye. When the light having the wavelength $\lambda 14$ is applied to the sample 10 that flows through the flow cell 110, the light is transmitted through the cell. The light, having the wavelength $\lambda 14$, which has been transmitted through the cell is used for generating a bright field image. For example, in the embodiment, the first fluorescence is in a wavelength band of green light, the second fluorescence is in a wavelength band of red light, and the third fluorescence is in a wavelength band of blue light.

The condenser lens 150 condenses the first fluorescence to the third fluorescence that are generated from the sample 10 flowing through the flow path 111 of the flow cell 110, and the transmitted light that has been transmitted through the sample 10 flowing through the flow path 111 of the flow cell 110. The optical unit 151 includes four dichroic mirrors combined with each other. The four dichroic mirrors of the optical unit 151 reflect the first fluorescence to the third fluorescence and the transmitted light at slightly different angles, respectively, to separate them on a light receiving surface of the imaging unit 160. The condenser lens 152 condenses the first fluorescence to the third fluorescence and the transmitted light.

The imaging unit 160 is implemented by a TDI (Time Delay Integration) camera. The imaging unit 160 takes images of the first fluorescence to the third fluorescence and the transmitted light, and outputs fluorescence images corresponding to the first fluorescence to the third fluorescence and a bright field image corresponding to the transmitted light, as image pickup signals, to the processing device 200. Hereinafter, the fluorescence images corresponding to the first fluorescence to the third fluorescence are referred to as "first image", "second image", and "third image", respectively. The "first image", the "second image", and the "third image" preferably have the same size in order to analyze overlapping of bright points. The "first image", the "second image", and the "third image" may be color images or gray scale images.

In the present embodiment, the bright point represents a small point of fluorescence generated in the fluorescence image. More specifically, the bright point represents a point of fluorescence generated from a fluorescent dye of a nucleic acid probe that binds to a gene which is a target portion in a nucleus.

Figure 2A:
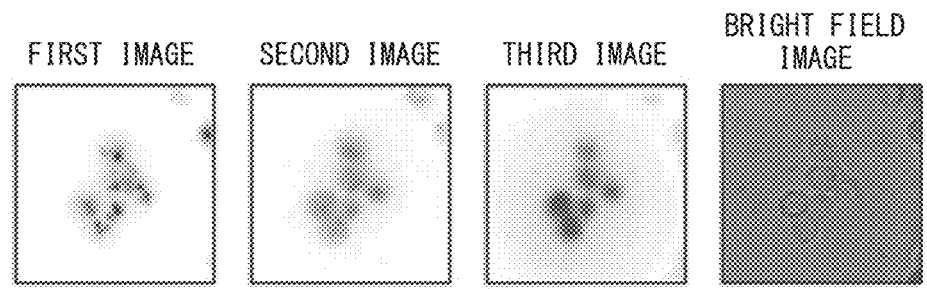
FIG. 2A illustrates first to third images and a bright field image which are obtained by the fluorescence image analyzer according to the embodiment.

FIG. 2A illustrates the first to the third images and the bright field image which are obtained by the fluorescence image analyzer according to the embodiment. In FIG. 2A, dot-like black portions in the first image represent bright points of the first fluorescence, that is, target portions labeled with the first fluorescent dye. In the second image, dark gray points are observed, less clearly than in the first image, in a light gray portion that represents a nucleus. These represent bright points of the second fluorescence, that is, the target portions labeled with the second fluorescent dye. In the third image, an almost round nucleus region is indicated in black. In the bright field image, an actual state of the cell can be observed. Each of the images shown in FIG. 2A represents, as an example, a preprocessed white blood cell, on a glass slide, which is observed by a microscope. The fluorescence image is taken such that, in raw data, the higher the intensity of the fluorescence is, the paler the image is, and the lower the intensity of the fluorescence is, the darker the image is. In the first to the third images shown in FIG. 2A, the gradation in the raw data of the taken image is inverted and the first to the third images are represented as gray scale images. When an image of the sample 10 flowing in the flow cell 110 is taken by the imaging unit 160 as described above, the fluorescence images and the bright field image are obtained for each cell since the cells are separated from each other in the flow path 111 and flow therein.

Returning to FIG. 1, the processing device 200 has a hardware configuration that includes, for example, a processing unit 11, a storage unit 12, a display unit 13, and an input unit 14. The processing unit 11 is implemented by a processor (CPU). The storage unit 12 is implemented by, for example, a memory (RAM) into and from which data can be written and read, and which is used as a work area for various processes performed by the processing unit 11, a read-only-memory (ROM) for storing computer programs and data, and a hard disk. The processing unit 11 and the storage unit 12 can be each implemented by a general-purpose computer. The hard disk may be included in the computer or may be an external device outside the computer. The display unit 13 is implemented by, for example, a display. The input unit 14 is implemented by, for example, a mouse, a keyboard, and a touch panel device. The processing unit 11 performs data transmission with the storage unit 12 via a bus 15, and performs data input and output with the display unit 13, the input unit 14, and the measurement device 100 via an interface 16.

For example, the processing unit 11 reads, into the RAM, various computer programs stored in the ROM or the hard disk and executes the computer programs, to process the fluorescence image of the cell which has been obtained by the sample 10 being measured by the measurement device 100 and to control operations of the display unit 13, the input unit 14, and the like.

Figure 3:
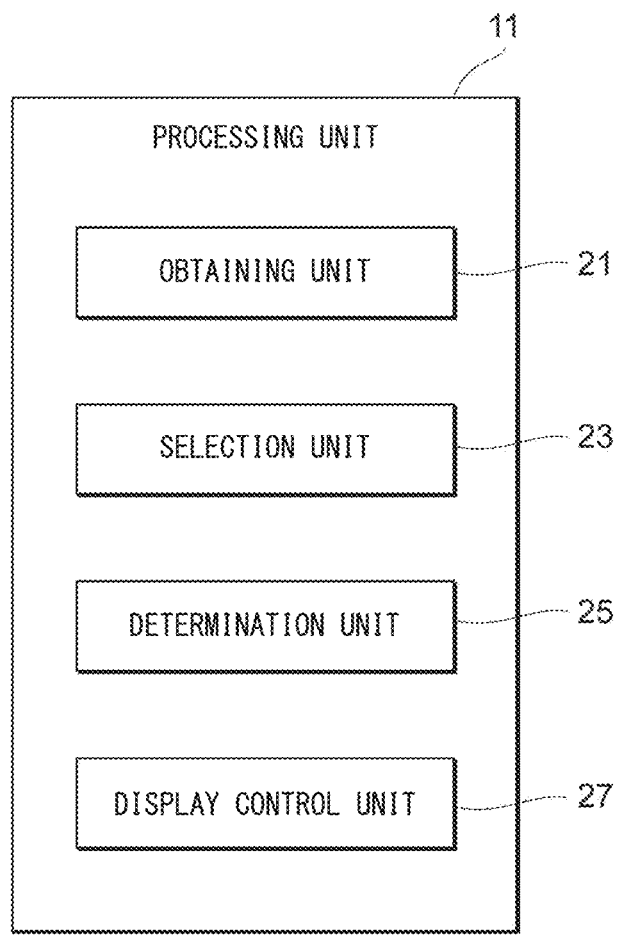
FIG. 3 illustrates one example of a functional block configuration of a processing unit of the fluorescence image analyzer according to the embodiment.

FIG. 3 illustrates one example of a block configuration of the processing unit 11 of the fluorescence image analyzer 1 according to the embodiment. As shown in FIG. 3, the processing unit 11 functionally includes an obtaining unit 21, a selection unit 23, a determination unit 25, and a display control unit 27.

For example, the obtaining unit 21 obtains the first to third images by inverting gradation of the raw data of the images taken by the imaging unit 160 and displaying the images as gray scale images. The obtaining unit 21 stores the obtained first to third images in the storage unit 12.

The obtaining unit 21 obtains a bright point pattern of fluorescence in the fluorescence image. For example, the obtaining unit 21 obtains a bright point pattern of the first fluorescence in the first image based on the first fluorescence, and a bright point pattern of the second fluorescence in the second image based on the second fluorescence.

Returning to FIG. 2, FIG. 2B illustrates extraction, of a region of a nucleus, performed by the fluorescence image analyzer according to the embodiment. FIGS. 2C and 2D each illustrate extraction, of a region of a bright point, performed by the fluorescence image analyzer according to the embodiment. The third image shown at the left end in FIG. 2B, the first image shown at the left end in FIG. 2C, and the second image shown at the left end in FIG. 2D are obtained from the same region of the sample 10 that flows through the flow cell 110 shown in FIG. 1.

Figure 2B:
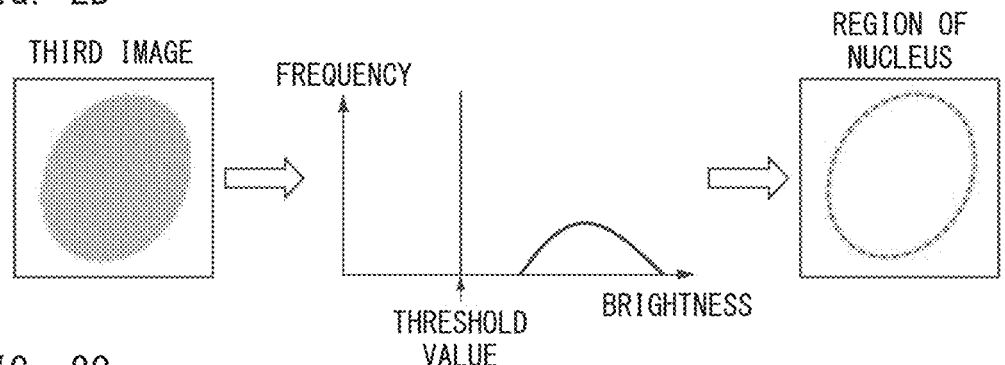
FIG. 2B illustrates extraction, of a region of a nucleus, performed by the fluorescence image analyzer according to the embodiment.
Figure 2C:
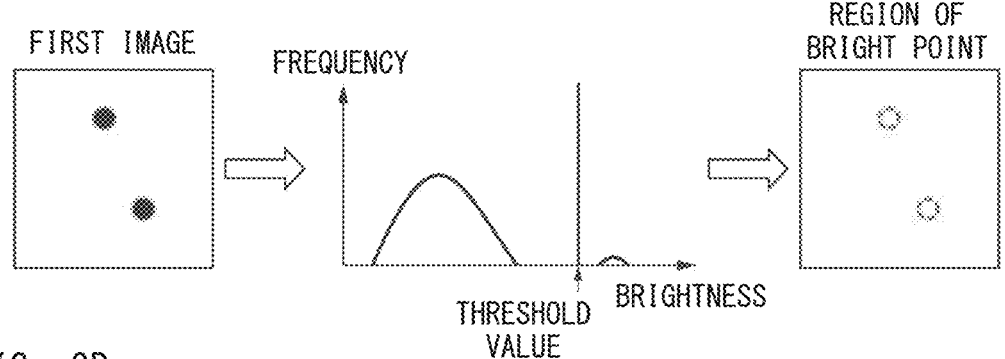
FIGS. 2C and 2D each illustrate extraction, of a region of a bright point, performed by the fluorescence image analyzer according to the embodiment.
Figure 2D:
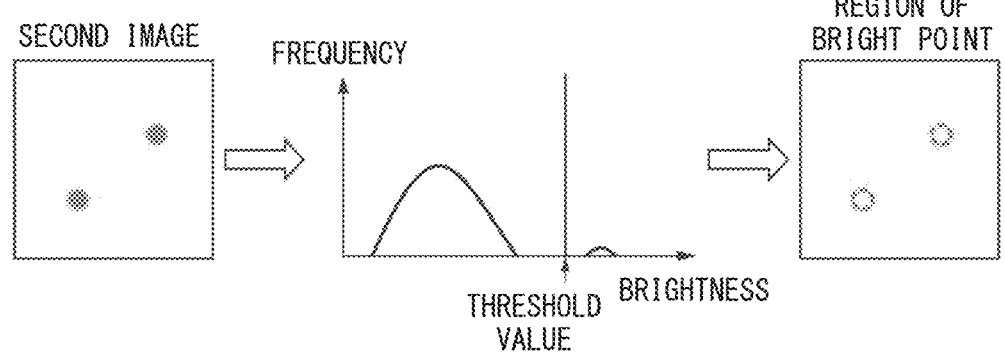

When the third image is obtained as shown at the left end in FIG. 2B, the obtaining unit 21 generates a graph of brightness against frequency based on the brightness in each pixel in the third image as shown at the center in FIG. 2B. The frequency on the vertical axis represents the number of pixels. The obtaining unit 21 sets a threshold value of the brightness in the graph. The obtaining unit 21 extracts, as a region of a nucleus, a range in which pixels each having a brightness higher than the threshold value are distributed, as indicated by broken lines at the right end in FIG. 2B. When two nuclei overlap each other in the third image, the first to the third images for the overlapping cells are not used for determining whether or not the preprocessing is appropriate and whether or not the cell is an abnormal cell, and are excluded.

When the first image is obtained as shown at the left end in FIG. 2C, the obtaining unit 21 generates a graph of brightness against frequency based on the brightness in each pixel in the first image as shown at the center of FIG. 2C. The obtaining unit 21 sets a threshold value of the brightness for a boundary between a bright point and a background in the graph based on, for example, the Otsu method. The obtaining unit 21 extracts, as a region of a bright point, a range in which pixels each having a brightness higher than the threshold value are distributed, as indicated by broken lines at the right end in FIG. 2C. When the region of the bright point is extracted from the first image, a bright point of an extremely small region, a bright point of an extremely large region, and a bright point which is not included in the region of the nucleus as shown at the right end in FIG. 2B are excluded.

When the second image is obtained as shown at the left end in FIG. 2D, the obtaining unit 21 generates a graph of brightness against frequency based on the brightness in each pixel in the second image as shown at the center in FIG. 2D, similarly to the first image. The obtaining unit 21 sets a threshold value of brightness in the graph and extracts, as a region of a bright point, a range in which pixels each having a brightness higher than the threshold value are distributed, as indicated by broken lines at the right end in FIG. 2D. When the region of the bright point is extracted from the second image, a bright point of an extremely small region, a bright point of an extremely large region, and a bright point which is not included in the region of the nucleus as shown at the right end in FIG. 2B are excluded.

The obtaining unit 21 may extract the region of the nucleus from the third image and extract the regions of the bright points from bright points in the first image and the second image by calculation according to the above-described procedure without generating the graph as shown at the center in each of FIGS. 2B to 2D. In extracting the bright point, a degree of matching between a region to be determined and a normal distribution waveform of the bright point may be determined. In this case, when the degree of the matching is high, the region to be determined may be extracted as the bright point. The obtaining unit 21 extracts the region of the nucleus from the third image, to detect a cell. However, the obtaining unit 21 may detect a cell based on the bright field image. When the cell is detected based on the bright field image, obtaining of the third image may be omitted.

Returning to FIG. 3, the selection unit 23 of the processing unit 11 selects, according to an instruction from an operator, at least one bright point pattern from among a plurality of bright point patterns that include one or more positive patterns and are previously associated with at least one of a measurement item or a labeling reagent. One example of the selection process of selecting a bright point pattern will be described below. For example, the processing unit 11 performs a process of selecting at least one bright point pattern associated with at least one of the measurement item or the labeling reagent for a sample, from among a plurality of bright point patterns which are stored in the storage unit 12 and associated with at least one of plural measurement items or plural labeling reagents.

FIG. 4A illustrates one example of a specifying screen SC1 for specifying a measurement item and a labeling reagent, on the display unit 13, according to the embodiment. As shown in FIG. 4A, on the specifying screen SC1, for example, an item "measurement item" or an item "probe name" (labeling reagent) can be specified by a drop-down menu method. For the "measurement item", for example, BCR/ABL fusion gene, ALK gene, deletion of the long arm of chromosome 5, or the like can be selected for each cell. For the "probe name", for example, when the "measurement item" is BCR/ABL fusion gene, the DF probe, the ES probe, or the like can be selected. The DF probe and the ES probe for BCR/ABL fusion gene and the like will be described below in detail.

The processing unit 11 causes the display unit 13 to display, to an operator, the specifying screen SC1 for specifying the measurement item and the labeling reagent for the sample 10 such that the contents of the measurement item can be specified more preferentially than the contents of the labeling reagent. For example, the processing unit 11 may perform control so as to display the item "measurement item" at a higher order than the item "probe name" in the specifying screen SC1, as shown in FIG. 4A. The processing unit 11 may perform display so as to highlight only the item "measurement item" in the specifying screen SC1. Moreover, the processing unit 11 may perform control such that, after the item "measurement item" is specified in the specifying screen SC1, the item "probe name" corresponding to the contents of the specified item, "measurement item", can be specified. The processing unit 11 may operate to initially display a specifying screen including the item "measurement item", and display a specifying screen, including the item "probe name", which is different from the specifying screen including the item "measurement item" after the "measurement item" has been specified, in order to allow an operator to specify the contents of the measurement item more preferentially than the contents of the labeling reagent. In this case, the processing unit 11 may perform control so as not to display the specifying screen including the "measurement item" when displaying the specifying screen including the item "probe name".

In the above-described configuration, the operator is allowed to specify the contents of the measurement item more preferentially than the contents of the labeling reagent. Therefore, after the bright point patterns associated with the measurement items have been narrowed, the bright point patterns associated with the labeling reagent can be further specified. Accordingly, the bright point pattern can be efficiently selected.

FIG. 4B illustrates one example of a positive pattern selection screen SC3 on the display unit 13 according to the embodiment. As shown in FIG. 4B, the processing unit 11 causes the display unit 13 to display all of one or more positive patterns that are previously associated with at least one of the measurement item or the labeling reagent such that the positive patterns can be selected. For example, when the operator specifies a measurement item "BCR-ABL" and a probe name "ES" in the specifying screen SC1 shown in FIG. 4A, the positive pattern selection screen SC3 shown in FIG. 4B is displayed on the display unit 13 shown in FIG. 1. In this example, the positive patterns that are included in the plurality of positive patterns stored in the storage unit 12 shown in FIG. 1 and associated with the measurement item "BCR-ABL" and the probe name "ES" are "typical pattern G1R2F1", "minor pattern G1R1F2", "9q deletion pattern G2R1F1", and "9q•22q deletion pattern G1R1F1" which are shown in FIG. 4B. Therefore, check boxes of the patterns in FIG. 4B are all checked. That is, all the positive patterns for which the determination results are to be displayed are selected. However, for example, when the operator operates the positive pattern selection screen SC3 to uncheck one or more of the check boxes, at least one positive pattern can be excluded from the positive patterns for which the determination results are to be displayed. Meanwhile, even if a positive pattern is excluded from the positive patterns for which the determination results are to be displayed, when the operator operates the positive pattern selection screen SC3 to press a "display all positive patterns" button BT, all of the check boxes corresponding to "typical pattern G1R2F1", "minor pattern G1R1F2", "9q deletion pattern G2R1F1", and "9q•22q deletion pattern G1R1F1" may be checked. The positive pattern selection screen SC3 may further include a button, for unchecking all the positive patterns, such as a "non-display of all positive patterns" button, which is not shown.

Only the positive patterns are displayed on the positive pattern selection screen SC3 shown in FIG. 4B. However, the positive pattern selection screen SC3 may include negative patterns associated with the measurement item "BDR-ABL" and the probe name "ES". That is, the processing unit 11 may operate to display a screen including bright point patterns that include positive patterns and negative patterns associated with the specified measurement item and probe name.

The processing unit 11 may change, according to an instruction from an operator, at least one of the selected bright point patterns. For example, the processing unit 11 may cause the display unit 13 to display the positive pattern selection screen SC3 such that the operator is allowed to change each positive pattern by a drop-down menu method. The operator is allowed to change at least one of "typical pattern G1R2F1", "minor pattern G1R1F2", "9q deletion pattern G2R1F1", or "9q•22q deletion pattern G1R1F1" to another pattern by operating the positive pattern selection screen SC3.

In the above-described configuration, at least one of the selected bright point patterns is changed according to the instruction from the operator. Therefore, at least one of the selected bright point patterns can be optionally changed.

The processing unit 11 manages, for each operator, an authority to operate the positive pattern selection screen SC3 on which at least one positive pattern can be selected. For example, the processing unit 11 causes the storage unit 12 to store identification information of the selection screen SC3 and identification information of the operator so as to associate the information with each other. The processing unit 11 may cause the display unit 13 to display the positive pattern selection screen SC3 associated with a specific operator who has the authority, with reference to the information stored in the storage unit 12.

In the above-described configuration, the specific operator having the authority is allowed to operate the positive pattern selection screen SC3 associated with the specific operator. Therefore, another operator is prohibited from operating the positive pattern selection screen SC3 and changing the positive pattern which has been desirably set by the specific operator without permission.

Figure 5A:
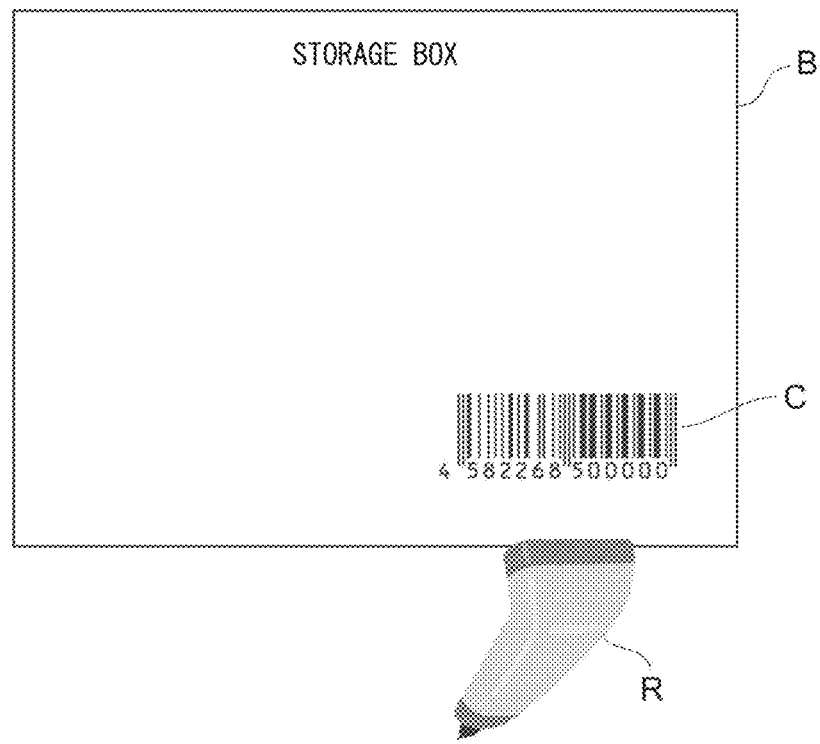
FIG. 5A illustrates one example of a reading process of reading a code on a storage box in which a labeling reagent is stored, with the use of a reading unit according to the embodiment.
Figure 5B:
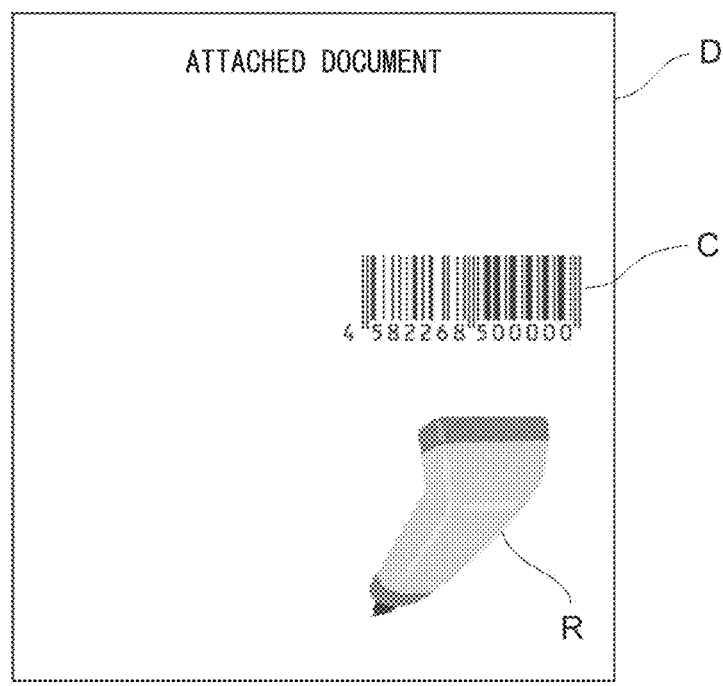
FIG. 5B illustrates one example of a reading process of reading a code on an attached document regarding the labeling reagent, with the use of a reading unit according to the embodiment.

FIG. 5A illustrates one example of a reading process of reading a code on a storage box in which a labeling reagent is stored, with the use of a reading unit according to the embodiment. FIG. 5B illustrates one example of a reading process of reading a code on an attached document regarding the labeling reagent, with the use of a reading unit according to the embodiment. As shown in FIGS. 5A and 5B, the fluorescence image analyzer 1 shown in FIG. 1 may further include a reading unit R for reading a code C on a storage box B in which the labeling reagent is stored, or on an attached document D regarding the labeling reagent. The obtaining unit 21 of the processing unit 11 shown in FIG. 3 obtains information included in the code C having been read by the reading unit R. The information included in the code C includes, for example, information regarding the probe name (labeling reagent), and at least one of the positive pattern or the negative pattern associated with the probe name.

The code C may be a bar code that is a one-dimensional code, or may include a QR code (registered trademark) that is a two-dimensional code, or another code.

FIG. 6 illustrates one example of a registration screen RC1 for registering information regarding a bright point pattern, on the display unit 13, according to the embodiment. As shown in FIG. 6, when the code C includes information regarding a new bright point pattern, the processing unit 11 causes the display unit 13 to display the registration screen RC1 for registering the information regarding the new bright point pattern. For example, as shown in FIGS. 5A and 5B, the reading unit R reads the code C on the storage box B in which a labeling reagent is stored, or the document D regarding the labeling reagent. The processing unit 11 refers to information, which is previously stored in the storage unit 12, such as the information regarding the probe name (labeling reagent) and information regarding at least one of the positive pattern or the negative pattern associated with the probe name. When the code C includes information other than the information which is previously stored in the storage unit 12, the processing unit 11 causes the display unit 13 to display the registration screen RC1 such that the operator is allowed to register the information regarding the new bright point pattern.

In the example shown in FIG. 6, the information regarding contents (for example, "measurement item", "probe name", "negative pattern name", "bright point information" for "negative pattern name", "positive pattern name", and "bright point information" for "positive pattern name") to be registered has been already inputted. However, in general, when the registration screen RC1 is displayed, the information has not been inputted yet, and the operator registers (for example, manually) each item with reference to the contents, to be registered, on the attached document D shown in FIG. 5B. For the contents to be registered, in the attached document D regarding a labeling reagent manufactured by a company other than SYSMEX CORPORATION or a commercially available labeling reagent, for example, a labeled position, and a positive pattern and a negative pattern in using the labeling reagent are written. Meanwhile, the code attached for the labeling reagent manufactured by SYSMEX CORPORATION includes information regarding the contents to be registered. When the information is read by the reading unit R, the information regarding the contents to be registered may be automatically registered in the registration screen RC1. The contents to be registered in the registration screen RC1 may be optionally edited by an operator or may be managed so as to be edited only by an operator having the authority as in the positive pattern selection screen SC3 shown in FIG. 4B.

In the above-described configuration, the reading unit R reads the code C on the storage box B in which the labeling reagent is stored or on the document D regarding the labeling reagent. When the code C having been read includes information regarding a new bright point pattern, the registration screen for registering the information regarding the new bright point pattern is displayed on the display unit 13. Therefore, the information regarding the new bright point pattern can be assuredly and easily obtained, and the registration screen for registering the information regarding the new bright point pattern can be displayed.

The processing unit 11 may cause the display unit 13 to display the registration screen RC1 in a predetermined display manner for prompting an operator to register the information regarding the new bright point pattern. For example, the processing unit 11 is configured such that, when the labeling reagent is manufactured by another company or a commercially available one, the operator manually inputs the information regarding the contents to be registered as described above. Therefore, for example, "G" representing the first bright point, "R" representing the second bright point, and "F" representing the third bright point may be previously displayed since they will be registered commonly into the "bright point information" on the registration screen RC1. Specifically, when the registration screen RC1 is displayed on the display unit 13, the operator may be prompted to register 0, 1, 2, or 3 merely in "(space)" portion by "G R F" being previously displayed in the "bright point information" for the "positive pattern name".

In the above-described configuration, workload on an operator is reduced when the operator registers the information regarding the new bright point pattern.

Returning to FIG. 3, the determination unit 25 of the processing unit 11 determines what positive pattern, among one or more positive patterns included in the selected bright point patterns, corresponds to the obtained bright point pattern, based on the obtained bright point pattern and the selected bright point patterns.

One example of the determination process will be described below. A determination method for determining whether or not a cell is an abnormal cell having chromosomal abnormality will be described as one example.

FIG. 7A illustrates an example of arrangement of bright points in a normal cell having no chromosomal abnormality, that is, a bright point pattern (negative pattern). FIGS. 7B to 7D each illustrate an example of a bright point pattern (positive pattern) of an abnormal cell. In each of FIGS. 7A to 7D, each image that overlaps the third image is displayed.

As shown in FIG. 7A, when chromosomal abnormality such as translocation of the BCR gene locus and the ABL gene locus does not occur, each gene includes a pair of alleles which exist independently in one nucleus. Therefore, in the first image, two first bright points are in one nucleus region. In the second image, two second bright points are in one nucleus region. In this case, when the first image and the second image which are taken with the same size are combined so as to overlap each other, the two first bright points and the two second bright points are in one nucleus region in the composite image so as not to overlap each other. Therefore, the cell in which the two first bright points and the two second bright points are in the nucleus region as shown in FIG. 7A, is recognized as having no chromosomal abnormality, that is, the cell is determined as a normal cell that is negative for chromosomal abnormality.

One example of the positive pattern will be described by using an exemplary case where a probe [Cytocell BCR/ABL Translocation, Extra Signal (ES) Probe (manufactured by SYSMEX CORPORATION)] (hereinafter, may be simply referred to as "ES probe") of which the target is BCR/ABL fusion gene is used. There are a plurality of types of probes of which the targets are each BCR/ABL fusion gene.

FIG. 8A and FIG. 8B each illustrate one example of target portions with which a probe is to be hybridized. The BCR gene is at chromosome 22q11.22-q11.23, and a probe to be hybridized with the BCR gene locus is labeled with the first fluorescence (for example, green). The ABL gene is at chromosome 9q34.11-q34.12, and a probe to be hybridized with the ABL gene locus is labeled with the second fluorescence (for example, red). FIG. 8A illustrates a portion to be bound to the above-described ES probe. FIG. 8B illustrates a portion to be bound to the Cytocell BCR/ABL Translocation, Dual Fusion (DF) Probe (SYSMEX CORPORATION, Cat No. LPH007) (hereinafter, may be simply referred to as "DF probe").

As shown in FIG. 7B, when a part of the ABL gene locus is moved to chromosome 22 by translocation, two first bright points are in the nucleus in the first image, and three second bright points are in the nucleus in the second image. In this case, when the first image and the second image are combined, one first bright point, two second bright points, and a bright point (fused bright point) of one fourth fluorescence (for example, yellow) in which the first bright point and the second bright point overlap each other are in one nucleus in the composite image. Therefore, in the cell that includes the bright points as shown in FIG. 7B, translocation of the BCR gene and the ABL gene has occurred. That is, the cell is determined as an abnormal cell that is positive for chromosomal abnormality.

As shown in FIG. 7C, when a part of the BCR gene locus is moved to chromosome 9 and a part of the ABL gene is moved to chromosome 22 by translocation, three first bright points are in the nucleus in the first image, and three second bright points are in the nucleus in the second image. In this case, when the first image and the second image are combined, one first bright point, one second bright point, and two fused bright points at each of which the first bright point and the second bright point overlap each other are in one nucleus in the composite image. Therefore, in the cell that includes the bright points as shown in FIG. 7C, translocation of the BCR gene locus and the ABL gene locus has occurred. That is, the cell is determined as an abnormal cell that is positive for chromosomal abnormality.

As shown in FIG. 7D, when the ABL gene locus is moved to chromosome 22 by translocation, two first bright points are in the nucleus in the first image, and two second bright points are in the nucleus in the second image. In this case, when the first image and the second image are combined, one first bright point, one second bright point, and one fused bright point at which the first bright point and the second bright point overlap each other are in one nucleus in the composite image. Therefore, in the cell that includes the bright points as shown in FIG. 7D, translocation of the BCR gene locus and the ABL gene locus has occurred. That is, the cell is determined as an abnormal cell that is positive for chromosomal abnormality.

As described above, whether or not each cell is an abnormal cell having chromosomal abnormality can be determined based on the positions and the number of the bright points in the composite image in which the first image and the second image are combined. Therefore, the processing unit 11 counts, for each cell, the number of the bright points at each position in the composite image in which the first image and the second image are combined, as the bright point pattern of fluorescence in the fluorescence image. That is, the processing unit 11 counts the number of the first bright points at positions where the first bright points do not overlap the second bright points, the number of the second bright points at positions where the second bright points do not overlap the first bright points, and the number of the fused bright points at positions where the first bright points and the second bright points overlap each other. For example, in FIG. 7D, the bright point pattern can be represented such that the number of the independent first bright points is "1", the number of the independent second bright points is "1", and the number of the fused bright points each of which includes the first bright point and the second bright point is "1".

The first bright point, the second bright point, and the fused bright point may be represented by colors. For example, the independent first bright point may be represented as green (G), the independent second bright point may be represented as red (R), and the fused bright point may be represented as yellow (F). By the number of the bright points for each of G, R, and F being indicated immediately after G, R, F, the bright point pattern can be represented. For example, in FIG. 7D, the bright point pattern can be represented as "G1R1F1".

The bright point pattern of fluorescence in the fluorescence image can also be generated such that the number of the first bright points described above is the total number of the first bright points in the first image and the number of the second bright points described above is the total number of the second bright points in the second image. For example, in FIG. 7D, the bright point pattern can be generated such that the number of the first bright points in the first image is "2", the number of the second bright points in the second image is "2", and the number of the fused bright points in which the first bright point and the second bright point overlap each other in the composite image is "1", and the bright point pattern can be represented as "G2R2F1". This also indicates the same meaning.

Whether or not the first bright point in the first image and the second bright point in the second image overlap each other in the composite image can be determined according to a proportion of a region in which the first bright point and the second bright point overlap each other, for example, according to whether or not a proportion of pixels, among a plurality of pixels included in the first bright point, which are located at the same positions (coordinate information (x, y)) as positions of pixels in the second bright point is greater than a threshold value. Furthermore, whether or not the first bright point in the first image and the second bright point in the second image overlap each other in the composite image can also be determined according to whether or not a distance between the center point (position of the pixel at which the intensity of the fluorescence is highest) of the first bright point and the center point (position of the pixel at which the intensity of fluorescence is highest) of the second bright point is less than a threshold value.

The bright point pattern of fluorescence in the fluorescence image obtained for each cell may be represented as the number of bright points for each color in the composite image. That is, instead of each image being displayed as a gray scale image, the color of each pixel in the first image is displayed by color gradation (RGB value) of green, and the color of each pixel in the second image is displayed by color gradation (RGB value) of red, based on the pixel value. When the images are combined so as to overlap each other, if the cell is determined as an abnormal cell based on a combination of RGB values of the pixels in the composite image, the green first bright point, the red second bright point, and the yellow fused bright point in which the first bright point and the second bright point overlap each other are in the nucleus region. Therefore, also by the number of the bright points for each color being counted as the bright point pattern, whether or not the cell is an abnormal cell can be determined.

As described above, the processing unit 11 determines whether the cell is an abnormal cell or a normal cell, based on the bright point pattern obtained for each cell. In the present embodiment, the storage unit 12 stores reference patterns (a plurality of bright point patterns, including one or more positive patterns, which are previously associated with at least one of the measurement item or the labeling reagent) for determining whether the cell is an abnormal cell or a normal cell. The processing unit 11 determines whether or not each cell is an abnormal cell, by comparing the bright point pattern obtained for each cell with the reference pattern (at least one bright point pattern) selected by the selection unit 23 from the plurality of the reference patterns stored in the storage unit 12.

The reference pattern includes at least one of a bright point pattern (positive pattern) of fluorescence in the fluorescence image of an abnormal cell having chromosomal abnormality, and a bright point pattern (negative pattern) of fluorescence in the fluorescence image of a normal cell having no chromosomal abnormality, as shown in, for example, FIGS. 7A to 7D. In the present embodiment, the reference patterns include both the bright point pattern (positive pattern) of an abnormal cell and the bright point pattern (negative pattern) of a normal cell.

When the bright point pattern of a cell to be analyzed matches the negative pattern in the comparison in bright point pattern, the processing unit 11 determines that the cell is a normal cell. Meanwhile, when the bright point pattern of the cell to be analyzed does not match the negative pattern, the processing unit 11 compares the bright point pattern with a typical positive pattern. When the bright point pattern matches the typical positive pattern, the processing unit 11 determines that the cell is a typical abnormal cell. Meanwhile, when the bright point pattern does not match the typical positive pattern, the processing unit 11 determines the cell is an atypical abnormal cell. The processing unit 11 repeats the same comparison process for all of the cells to be analyzed, and determines whether each cell is an abnormal cell or a normal cell. The processing unit 11 causes the storage unit 12 to store the determination result for each cell.

As described above, in the fluorescence image analyzer 1, the bright point patterns which are previously associated with at least one of the measurement item or the labeling reagent may further include a negative pattern, and the processing unit 11 may determine whether or not the sample 10 corresponds to the negative pattern included in the selected bright point patterns, based on the obtained bright point pattern and the selected bright point patterns.

In the above-described configuration, not only the positive pattern but also the negative pattern included in the selected bright point patterns can be further referred to. Therefore, accuracy for determining whether or not the cell included in the sample is abnormal can be further improved.

Returning to FIG. 3, the display control unit 27 of the processing unit 11 controls the display unit 13 so as to display various screens thereon. The various screens include, for example, the specifying screen SC1 shown in FIG. 4A, the positive pattern selection screen SC3 shown in FIG. 4B, the registration screen RC1 shown in FIG. 6, and a determination result screen RC3 described below with reference to FIG. 9.

Figure 9:
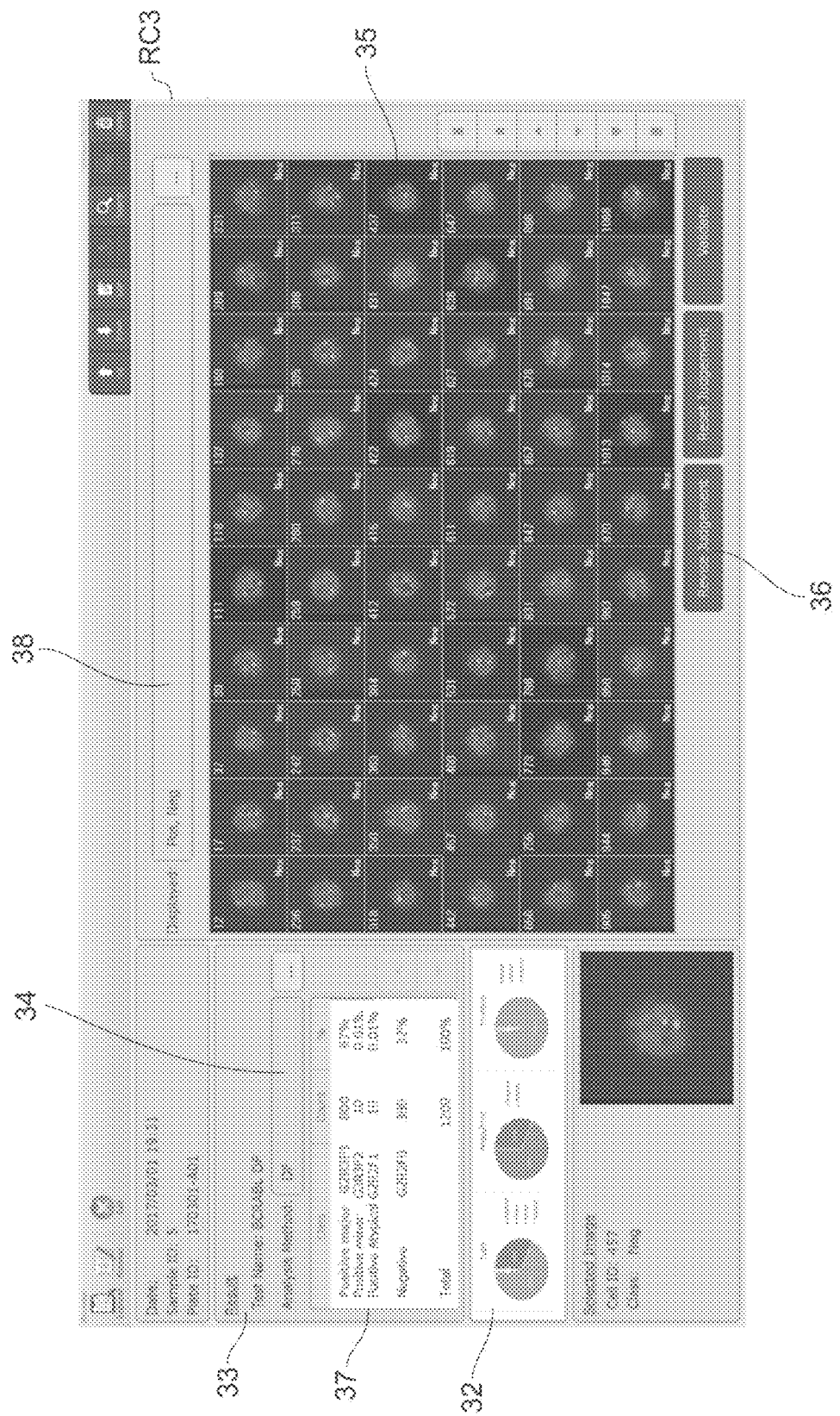
FIG. 9 illustrates one example of a determination result screen in the display unit of the fluorescence image analyzer according to the embodiment.

FIG. 9 illustrates one example of the determination result screen RC3 on the display unit 13 according to the embodiment. As shown in FIG. 9, the display control unit 27 causes the display unit 13 to display information regarding a determination result for each analyzed cell. The processing unit 11 causes the display unit 13 to display, for example, a fluorescence image (composite image of the first image, the second image, and the third image) of a cell determined as an abnormal cell, and a fluorescence image (composite image of the first image, the second image, and the third image) of a cell determined as a normal cell, as the information regarding the determination result.

On the determination result screen RC3 shown in FIG. 9, fluorescence images are aligned and displayed horizontally and vertically for each cell, among cells to be analyzed, detected based on a predetermined analyzing method. On the determination result screen RC3, a measurement item 33 used for analyzing the cell is displayed, and an analyzing method selection box 34 that allows an analyzing method to be selected is displayed. On the analyzing method selection box 34, whether or not a DF pattern is to be detected in the analyzing method for a normal cell can be determined. On the analyzing method selection box 34, for example, whether a typical abnormal cell (ES major pattern) or an atypical abnormal cell (ES minor pattern, ES deletion pattern) is to be detected in the analyzing method for an abnormal cell can be determined. The determination result screen RC3 includes a display image selection box 38 for allowing selection from among an option for displaying a fluorescence image of a cell determined as an abnormal cell (positive), an option for displaying a fluorescence image of a cell determined as a normal cell (negative), and an option for displaying fluorescence images of all the analyzed cells, in a drop-down menu method, for the cell detected based on the analyzing method selected in the analyzing method selection box 34.

The processing unit 11 operates to display a cell fluorescence image selected in the display image selection box 38 for the cell detected based on the analyzing method selected in the analyzing method selection box 34, on an image display box 35 of the determination result screen RC3. In the cell fluorescence images displayed in the image display box 35, not only a Cell ID but also a determination result indicating whether the cell is an abnormal cell (positive) or a normal cell (negative) is displayed for each cell fluorescence image. The fluorescence image of a cell determined as a normal cell, or the fluorescence images of all the analyzed cells may be displayed according to the selection in the display image selection box 38.

Thus, an operator or the like is allowed to observe the fluorescence image of the cell determined as an abnormal cell on the display unit 13. When the cell determined as an abnormal cell is determined as a normal cell according to the observation by the operator or the like, the processing unit 11 revises, to a normal cell, the determination result for the abnormal cell that is selected by the operator or the like as a normal cell through the input unit 14 from among the fluorescence images of the abnormal cells displayed on the display unit 13, and that is revised by a revision button ("Revise Judgement") 36. The processing unit 11 causes the storage unit 12 to store the revised determination result. Similarly, when the cell determined as a normal cell is determined as an abnormal cell according to observation by an observer such as the operator, the processing unit 11 revises, to an abnormal cell, the determination result for the normal cell that is selected by the operator or the like as an abnormal cell through the input unit 14 from among the fluorescence images of the normal cells displayed on the display unit 13, and that is revised by the revision button 36. The processing unit 11 causes the storage unit 12 to store the revised determination result. Thus, accuracy for determining whether the cell is an abnormal cell or a normal cell can be improved. The processing unit 11 can also cause the display unit 13 to display again the fluorescence image of the cell revised as an abnormal cell or a normal cell.

Thus, the processing unit 11 causes the display unit 13 to display the determination result screen RC3 including a result of determining what positive pattern, among one or more positive patterns included in the bright point patterns, corresponds to the obtained bright point pattern.

In the above-described configuration, the operator is allowed to easily recognize the determination result.

The processing unit 11 generates the information regarding the determination result of the sample 10, based on the determination result of determining whether or not each cell is an abnormal cell. For example, the processing unit 11 performs a process of generating information of at least one of the number of abnormal cells, a proportion of the abnormal cells, the number of normal cells, or a proportion of the normal cells, based on the analysis result by the analyzing method selected in the analyzing method selection box 34. The proportion of the number of abnormal cells and the proportion of the number of normal cells may be, for example, proportions relative to the number of all the detected cells (the sum of the number of cells determined as abnormal cells and the number of cells determined as normal cells) or may be proportions relative to the total number of the analyzed cells.

The processing unit 11 causes the storage unit 12 to store information of at least one of the number of abnormal cells, the proportion of the abnormal cells, the number of normal cells, or the proportion of the normal cells, and causes the display unit 13 to display the information. In one example of the determination result screen RC3 shown in FIG. 9, a determination result box 37 is provided, and the number and proportion of cells determined as abnormal cells and the number and proportion of cells determined as normal cells are displayed in the determination result box 37. In this example, the number and proportion of typical abnormal cells (positive major) determined as "G2R3F1", the number and proportion of typical abnormal cells (positive minor) determined as "G3R3F3", the number and proportion of atypical abnormal cells (positive atypical) determined as "G2R2F1", and the number and proportion of normal cells (negative) determined as "G2R2F0" are displayed in the determination result box 37. Other than this, for example, when the analyzing method for detecting an atypical abnormal cell (ES minor pattern, ES deletion pattern) is selected in the analyzing method selection box 34, the number and proportion of cells determined as atypical abnormal cells (positive) and the number and proportion of cells determined as normal cells (negative) may be displayed in the determination result box 37.

As indicated in the determination result box 37 shown in FIG. 9, the processing unit 11 causes the display unit 13 to display information of at least one of the number of abnormal cells included in the sample 10, the proportion of the abnormal cells, the number of normal cells included in the sample 10, or the proportion of the normal cells.

In the above-described configuration, an operator is allowed to easily recognize the information of at least one of the number of abnormal cells included in the sample 10, the proportion of the abnormal cells, the number of normal cells included in the sample 10, or the proportion of the normal cells.

As indicated in the image display box 35 and the determination result box 37 shown in FIG. 9, the processing unit 11 causes the display unit 13 to display the information of at least one of the number of abnormal cells included in the sample 10, the proportion of the abnormal cells, the number of normal cells included in the sample 10, or the proportion of the normal cells, together with the fluorescence images of the cells included in the sample 10.

In the above-described configuration, an operator is allowed to confirm information of at least one of the number of abnormal cells included in the sample 10, the proportion of the abnormal cells, the number of normal cells included in the sample 10, or the proportion of the normal cells, together with the fluorescence images of the cells included in the sample 10.

As indicated in the determination result box 37 shown in FIG. 9, the processing unit 11 may cause the display unit 13 to display the determination result regarding a positive pattern (for example, typical abnormal cell (positive major)) for which the number of abnormal cells or the proportion of abnormal cells is greatest, in a display manner different from that for the determination result regarding other positive patterns. For example, the information regarding the positive pattern for which the number of abnormal cells or the proportion of abnormal cells is greatest, may be displayed in red, and the information regarding the other bright point patterns may be displayed in black. The information regarding the positive pattern for which the number of abnormal cells or the proportion of abnormal cells is greatest may be highlighted. The information regarding the positive pattern for which the number of abnormal cells or the proportion of abnormal cells is greatest may be indicated as bold characters.

In the above-described configuration, an operator is allowed to more easily recognize the determination result regarding the positive pattern for which the number of abnormal cells or the proportion of abnormal cells is greatest, on the determination result screen RC3 including various determination results.

The processing unit 11 may generate, as the information regarding the determination result for the sample 10, various other information such as text information indicating, for example, "may be positive" or "may be negative", and cause the display unit 13 to display the other information.

Figure 10:
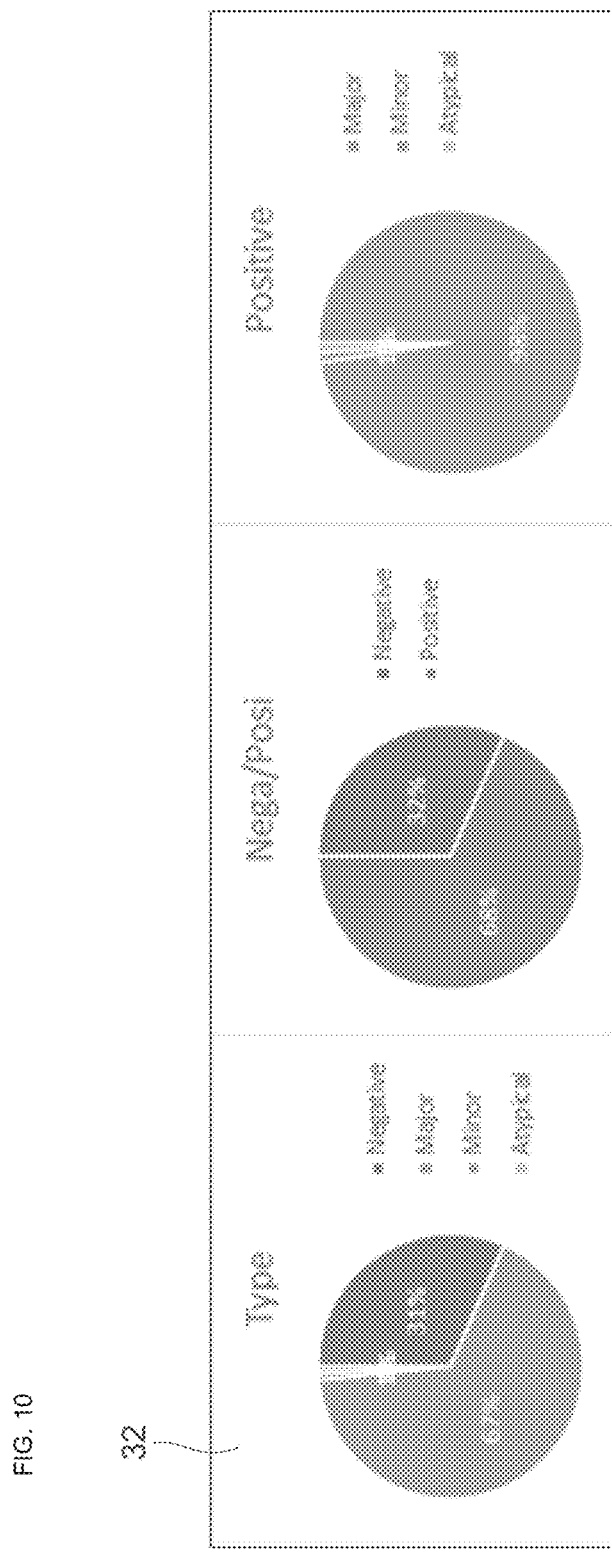
FIG. 10 is an enlarged view of a part of the determination result screen shown in FIG. 9.

FIG. 10 is an enlarged view of a part of the determination result screen RC3 shown in FIG. 9. As shown in FIG. 9 and FIG. 10, the processing unit 11 may cause the display unit 13 to display the determination result screen RC3 that includes a graph display box 32 in which the information regarding the determination result is represented as a graph. As shown in FIG. 10, a circle graph for "Type" indicates a proportion of each of typical abnormal cells, atypical abnormal cells, and normal cells, a circle graph for "Nega/Posi" indicates a proportion between the abnormal cells and the normal cells, and a circle graph for "Positive" indicates a proportion between typical abnormal cells and atypical abnormal cells.

As shown in FIG. 9 and FIG. 10, the processing unit 11 may cause the display unit 13 to display a graph image indicating at least one of the proportion of abnormal cells included in the sample 10 or the proportion of normal cells included in the sample 10, together with text information indicating at least one of the proportion of the abnormal cells included in the sample 10 or the proportion of the normal cells included in the sample 10. The information may be indicated by another graph such as a bar graph other than a circle graph.

In the above-described configuration, an operator is allowed to confirm the text information indicating at least one of the proportion of abnormal cells included in the sample 10 or the proportion of normal cells included in the sample 10, together with the graph image. The operator is allowed to confirm the graph image, and is thus allowed to easily recognize the proportion of abnormal cells or the proportion of normal cells.

Figure 11:
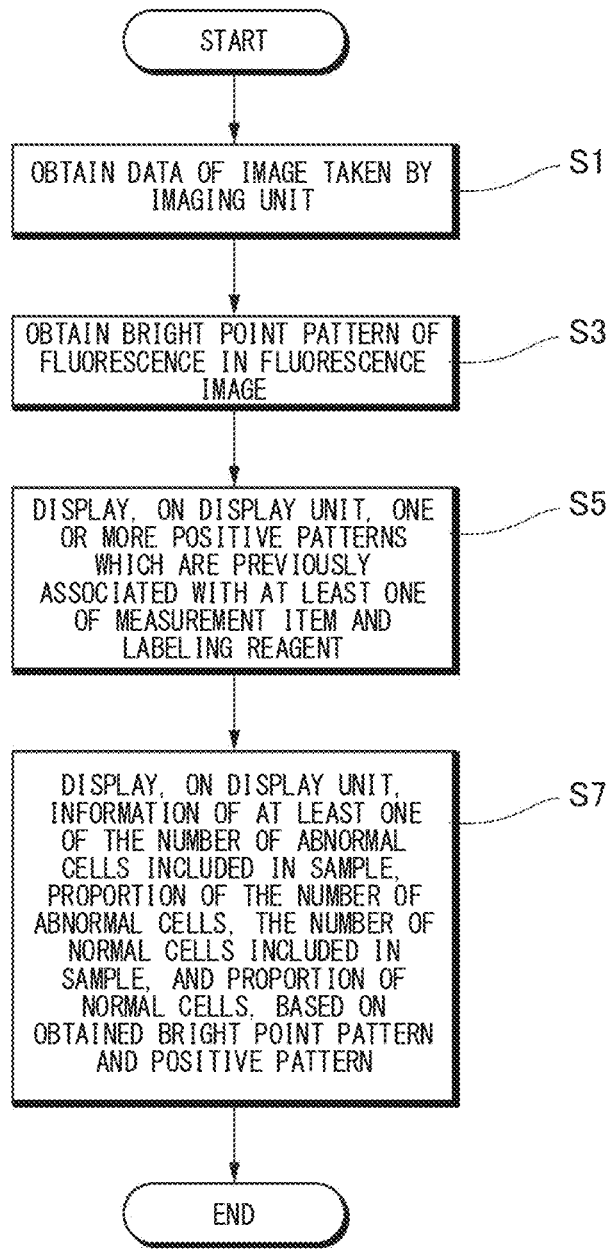
FIG. 11 is a flow chart showing one example of an operation performed by the processing unit of the fluorescence image analyzer, according to the embodiment.

One example of a fluorescence image analyzing method that is executed by the processing unit 11 based on a computer program that specifies a procedure of analyzing a fluorescence image of a cell will be described below with reference to FIG. 11. FIG. 11 is a flow chart showing one example of an operation performed by the processing unit of the fluorescence image analyzer, according to the embodiment. The computer program is previously stored in the storage unit 12 shown in FIG. 1. However, the computer program may be installed from, for example, a portable computer-readable storage medium (not shown) such as a CD-ROM, or may be downloaded and installed from, for example, an external server (not shown) via a network (not shown).

As shown in FIG. 11, for example, the processing unit 11 obtains the first to the third images by subjecting images of raw data taken by the imaging unit 160 to gradation inversion and representing the images as gray scale images (step S1). The processing unit 11 obtains a bright point pattern of fluorescence in a fluorescence image (step S3). The processing unit 11 causes the display unit 13 to display one or more positive patterns that are previously associated with at least one of the measurement item or the labeling reagent (step S5). The processing unit 11 causes the display unit 13 to display the determination result for the sample 10 based on the obtained bright point pattern and the positive patterns (step S7). Hereinafter, step S3 will be described in detail with reference to FIG. 12, step S5 will be described in detail with reference to FIG. 13, and step S7 will be described in detail with reference to FIG. 14 to FIG. 16.

Figure 12:
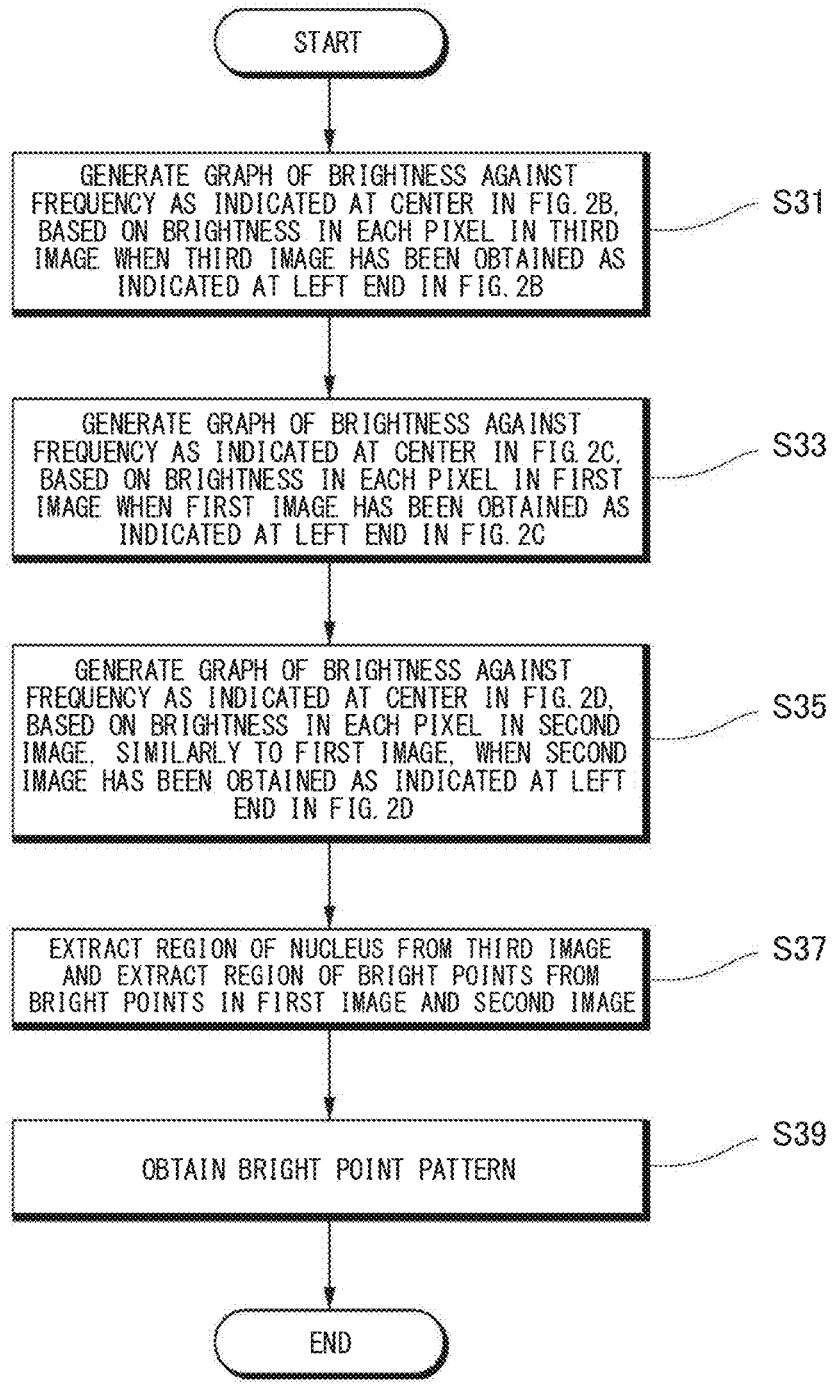
FIG. 12 is a flow chart showing one example of a process performed by the processing unit of the fluorescence image analyzer for obtaining a bright point pattern, according to the embodiment.

FIG. 12 is a flow chart showing one example of a process performed by the processing unit of the fluorescence image analyzer for obtaining a bright point pattern, according to an embodiment. As shown in FIG. 12, when the third image has been obtained as indicated at the left end in FIG. 2B, the obtaining unit 21 shown in FIG. 3 generates a graph of brightness against frequency based on the brightness in each pixel in the third image as indicated at the center in FIG. 2B (step S31). When the first image has been obtained as indicated at the left end in FIG. 2C, the obtaining unit 21 generates a graph of brightness against frequency based on the brightness in each pixel in the first image as indicated at the center in FIG. 2C (step S33). When the second image has been obtained as indicated at the left end in FIG. 2D, the obtaining unit 21 generates a graph of brightness against frequency based on the brightness in each pixel in the second image as indicated at the center in FIG. 2D, similarly to the first image (step S35). The obtaining unit 21 extracts a region of a nucleus from the third image, and extracts regions of bright points from the bright points in the first image and the second image (step S37). The obtaining unit 21 generates a bright point pattern based on the extracted region of the nucleus and the extracted regions of the bright points (step S39).

Figure 13:
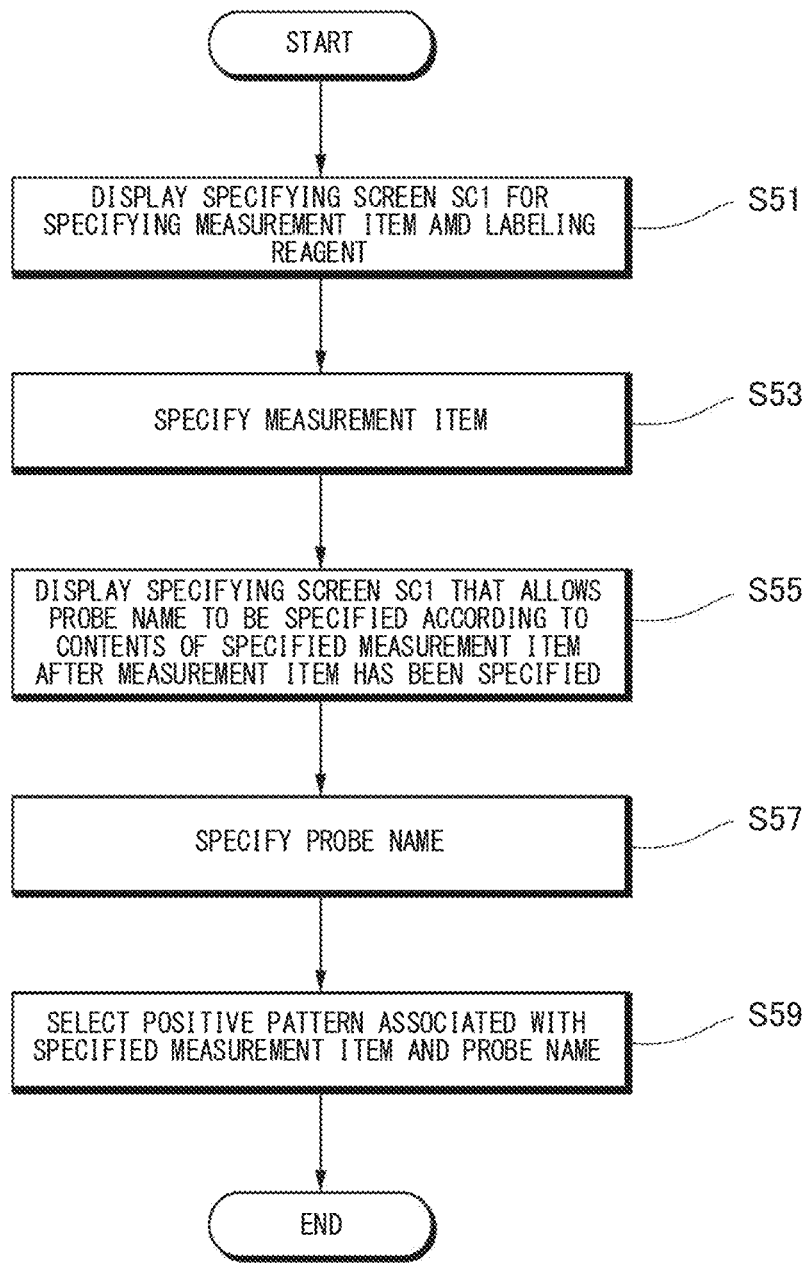
FIG. 13 is a flow chart showing one example of a process performed by the processing unit of the fluorescence image analyzer for selecting a bright point pattern, according to the embodiment.

FIG. 13 is a flow chart showing one example of a process performed by the processing unit of the fluorescence image analyzer for selecting a bright point pattern, according to the embodiment. As shown in FIG. 13, the display control unit 27 shown in FIG. 3 causes the display unit 13 to display the specifying screen SC1 (see FIG. 4A) for specifying a measurement item and a labeling reagent (step S51). An operator specifies the measurement item in the specifying screen SC1 displayed on the display unit 13 (step S53). After the measurement item has been specified, the display control unit 27 causes the display unit 13 to display the specifying screen SC1 such that a probe name corresponding to the contents of the specified measurement item can be specified (step S55). The operator specifies the probe name in the specifying screen SC1 displayed on the display unit 13 (step S57). The selection unit 23 selects positive patterns associated with the specified measurement item and probe name. The display unit 13 displays the positive patterns (step S59).

Figure 14:
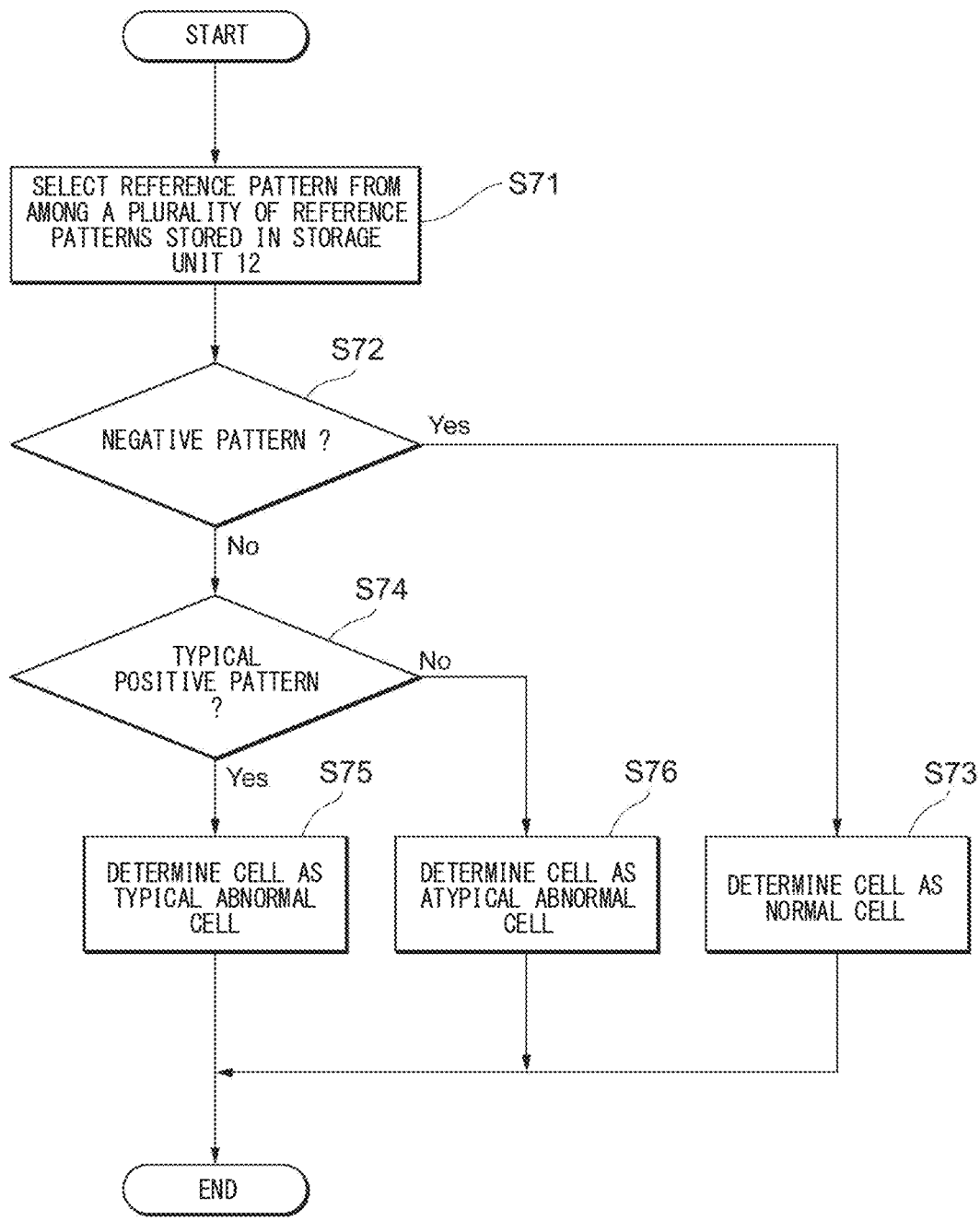
FIG. 14 is a flow chart showing one example of a determination process performed by the processing unit of the fluorescence image analyzer, according to the embodiment.

FIG. 14 is a flow chart showing one example of the determination process performed by the processing unit of the fluorescence image analyzer, according to the embodiment. As shown in FIG. 14, the selection unit 23 shown in FIG. 3 selects a reference pattern (at least one bright point pattern) from a plurality of reference patterns stored in the storage unit 12 (step S71). When the bright point pattern of a cell to be analyzed matches a negative pattern in the comparison in the bright point pattern, the determination by the determination unit 25 is Yes in step S72, and the process proceeds to step S73, in which the determination unit 25 determines that the cell is a normal cell. Meanwhile, when the bright point pattern of the cell to be analyzed does not match the negative pattern, the determination by the determination unit 25 is No in step S72, the process proceeds to step S74, and the bright point pattern of the cell to be analyzed is compared with a typical positive pattern. When the bright point pattern of the cell to be analyzed matches the typical positive pattern, the determination by the determination unit 25 is Yes in step S74, and the process proceeds to step S75, in which the determination unit 25 determines that the cell is a typical abnormal cell. Meanwhile, when the bright point pattern of the cell to be analyzed does not match the typical positive pattern, the determination by the determination unit 25 is No in step S74, and the process proceeds to step S76, in which the determination unit 25 determines that the cell is an atypical abnormal cell. The determination unit 25 repeats the same comparison process for all the cells to be analyzed, and determines whether each cell is an abnormal cell or a normal cell. The determination unit 25 causes the storage unit 12 to store the determination result for each cell.

Figure 15:
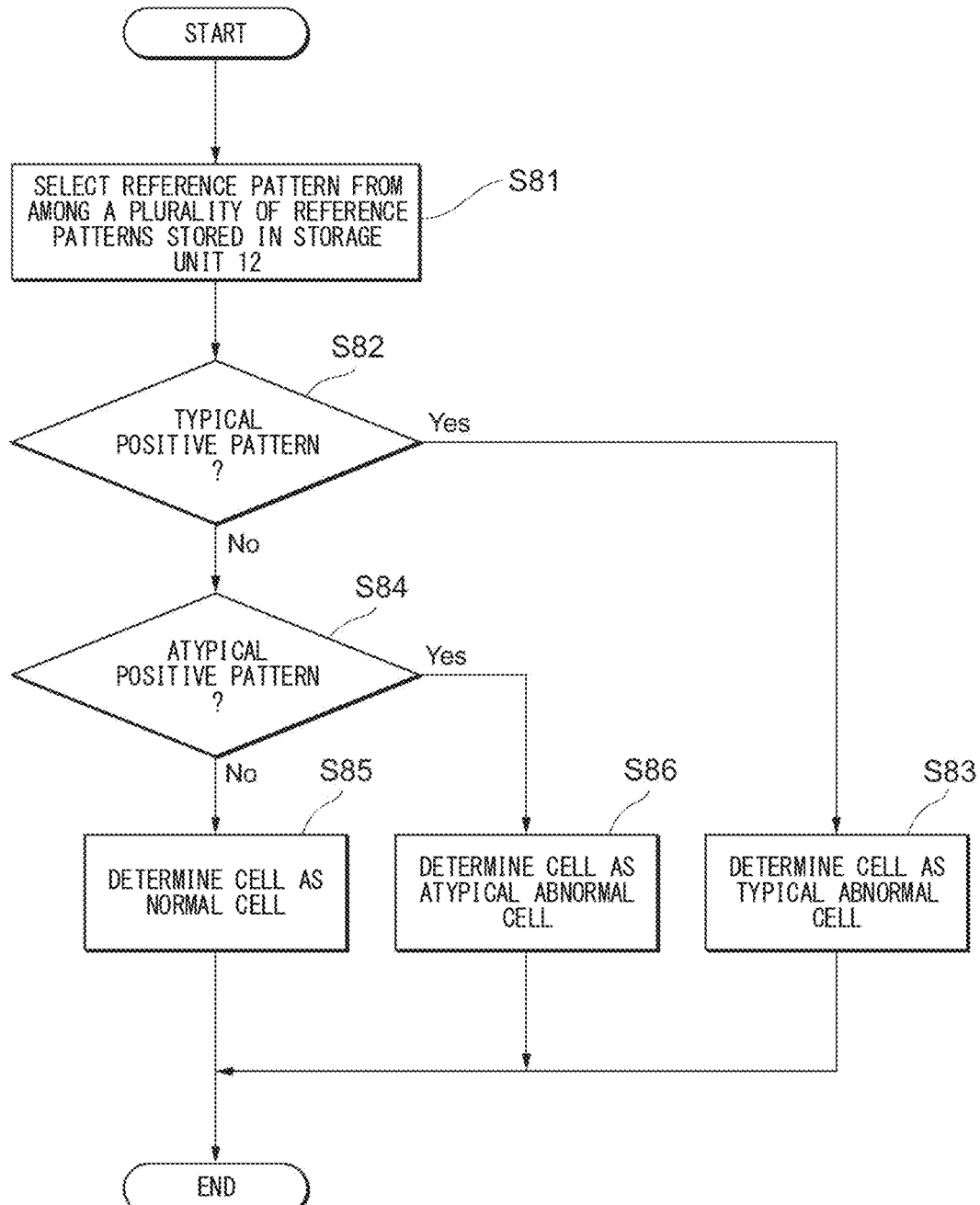
FIG. 15 is a flow chart showing another example of the determination process performed by the processing unit of the fluorescence image analyzer, according to the embodiment.

FIG. 15 is a flow chart showing one example of the determination process performed by the processing unit of the fluorescence image analyzer, according to the embodiment. The determination process shown in FIG. 15 is different from the determination process shown in FIG. 14 in that whether or not the bright point pattern of a cell to be analyzed matches a positive pattern is firstly determined in the determination process shown in FIG. 15 whereas whether or not the bright point pattern of a cell to be analyzed matches a negative pattern is firstly determined in the determination process shown in FIG. 14. As shown in FIG. 15, the selection unit 23 shown in FIG. 3 selects a reference pattern (at least one bright point pattern) from a plurality of reference patterns stored in the storage unit 12 (step S81). When the bright point pattern of a cell to be analyzed matches a typical positive pattern in the comparison in the bright point pattern, the determination by the determination unit 25 is Yes in step S82, and the process proceeds to step S83, in which the determination unit 25 determines that the cell is a typical abnormal cell. Meanwhile, when the bright point pattern of the cell to be analyzed does not match the typical positive pattern, the determination by the determination unit 25 is No in step S82, the process proceeds to step S84, and the determination unit 25 compares the bright point pattern of the cell to be analyzed with an atypical positive pattern. When the bright point pattern of the cell to be analyzed matches the atypical positive pattern, the determination by the determination unit 25 is Yes in step S84, and the process proceeds to step S86, in which the determination unit 25 determines that the cell is an atypical abnormal cell. Meanwhile, when the bright point pattern of the cell to be analyzed does not match the atypical positive pattern, the determination by the determination unit 25 is No in step S84, and the process proceeds to step S85, in which the determination unit 25 determines that the cell is a normal cell. The determination unit 25 repeats the same comparison process for all the cells to be analyzed, and determines whether each cell is an abnormal cell or a normal cell. The determination unit 25 causes the storage unit 12 to store the determination result for each cell.

In the determination process shown in FIG. 14 and FIG. 15, the number of the negative patterns may be plural. That is, when whether or not the bright point pattern of a cell to be analyzed matches a negative pattern is determined, the bright point pattern of the cell to be analyzed may be compared with a plurality of different negative patterns. Furthermore, in FIG. 14 and FIG. 15, when the bright point pattern of a cell to be analyzed does not match any of the positive patterns having been referred to or when the bright point pattern of a cell to be analyzed does not match any of the negative patterns having been referred to, information indicating that an error has occurred may be displayed on the display unit 13. Furthermore, in FIG. 14 and FIG. 15, when the bright point pattern of a cell to be analyzed does not match any of the positive patterns having been referred to or when the bright point pattern of a cell to be analyzed does not match any of the negative patterns having been referred to, other positive patterns or other negative patterns which are not included in the patterns to be referred to may be read from the storage unit 12, and the bright point pattern of the cell to be analyzed may be compared with the other positive patterns or the other negative patterns.

FIG. 16 is a flow chart showing one example of a display control process performed by the processing unit of the fluorescence image analyzer, according to the embodiment. As shown in FIG. 16, the display control unit 27 shown in FIG. 3 obtains the determination result from the determination unit 25 or the storage unit 12 (step S91). The display control unit 27 generates display information for displaying the determination result on the display unit 13, and outputs the generated display information to the display unit 13 (step S93). The display unit 13 displays the determination result screen RC3 shown in FIG. 9 based on the received display information (step S95).

As described above, according to the above-described embodiment, the fluorescence image analyzer 1 obtains a bright point pattern of fluorescence in a fluorescence image, and causes the display unit 13 to display a plurality of positive patterns that are previously associated with at least one of a measurement item or a labeling reagent, and causes the display unit 13 to display a determination result for the sample 10 based on the obtained bright point pattern and the positive patterns. Therefore, what positive pattern, among a plurality of positive patterns, corresponds to a cell included in the sample 10 can be inhibited from being undetermined. Accordingly, accuracy for determining whether the sample 10 is positive or negative can be improved.

Other Embodiments

The above-described embodiments are for allowing the present disclosure to be easily understood, and are not restrictive. The present disclosure can be changed/modified (for example, the embodiments may be combined, or a part of the structure of each embodiment may be omitted) without departing from the gist of the present disclosure and the present disclosure also includes its equivalents.

What is claimed is:

1. A fluorescence image analyzer for analyzing a fluorescence image of cells contained in a sample, the fluorescence image analyzer comprising:
    a light source configured to apply light to the sample;
    an image capture device having a light receiving surface and configured to capture a fluorescence image of the cells by which fluorescence is generated by applying the light;
    a processor programmed to:
    process the captured fluorescence image; and
    a display, wherein
    the processor is programmed to:
        obtain a bright point pattern of fluorescence in the captured fluorescence image;
        cause the display to display a list of different possible positive patterns, the list corresponding to at least one of a specified measurement item or a specified labeling reagent,
        receive, as a selection from the list, at least one of the different possible positive patterns; and
        cause the display to display information of at least one of an abnormal cell count in the sample or a proportion of abnormal cells in the sample, based on the obtained bright point pattern and the selection from the list of at least one of the plurality of different possible positive patterns.

2. The fluorescence image analyzer of claim 1, wherein the processor causes the display to display the list of different possible positive patterns, and check boxes arranged so as to provide user selection with a respective check box of different possible positive patterns from the list.

3. The fluorescence image analyzer of claim 1, wherein the processor is programmed to:
    manage, for each user, an authority for a particular user to operate a selection screen corresponding to that particular user that allows selection from among the list of different possible positive patterns; and
    cause the display to display the selection screen corresponding to the particular user having the authority.

4. The fluorescence image analyzer of claim 1, further comprising a memory configured to store a determination result for the cells included in the sample, wherein
    the processor causes the display to display the stored determination result.

5. The fluorescence image analyzer of claim 1, wherein the processor causes the display to display information of at least one of the abnormal cell count in the sample or the proportion of the abnormal cells in the sample, together with the fluorescence image of the cells.

6. The fluorescence image analyzer of claim 1, wherein the processor causes the display to display a graph image indicating the proportion of the abnormal cells in the sample, together with text information indicating the proportion of the abnormal cells in the sample.

7. The fluorescence image analyzer of claim 1, wherein the processor causes the display to display a determination result regarding a positive pattern for which the abnormal cell count is greatest, or the proportion of the abnormal cell is greatest, in a display manner different from that for a determination result regarding another positive pattern.

8. The fluorescence image analyzer of claim 1, wherein the different possible positive patterns are determined based on a color and a number of bright points of florescence.

9. The fluorescence image analyzer of claim 1, wherein the different possible positive patterns include a typical positive pattern and an atypical positive pattern.

10. The fluorescence image analyzer of claim 1, wherein the processor is further programmed to receive at least one of a selection of the specified measurement item indicative of a type of measurement or a selection of the specified labeling reagent indicative of a probe, and the list of different possible positive patterns are made available for selection based on the selection of at least one of the specified measurement item or the selection of the specified labeling reagent.

11. The fluorescence image analyzer of claim 1, wherein the list of different possible positive patterns include at least one of a typical positive pattern, an atypical positive pattern, or a minor positive pattern,
the abnormal cells include at least one of typical abnormal cells, atypical abnormal cells, or minor abnormal cells, and
the processor is programmed to cause the display to display information of at least one of a count of the typical abnormal cells in the sample as the abnormal cell count, a proportion of the typical abnormal cells in the sample as the proportion of abnormal cells, a count of the atypical abnormal cells in the sample as the abnormal cell count, a proportion of the atypical abnormal cells in the sample as the proportion of abnormal cells, a count of the minor abnormal cells in the sample as the abnormal cell count, or a proportion of the minor abnormal cells in the sample as the proportion of abnormal cells based on the obtained bright point pattern and the selection of at least one of the list of different possible positive patterns.

12. A fluorescence image analyzing method for analyzing a fluorescence image of cells contained in a sample, the method comprising:
capturing a fluorescence image of the cells by which fluorescence is generated by applying light to the sample; and
processing the captured fluorescence image, wherein the processing comprises:
obtaining a bright point pattern of fluorescence in the fluorescence image;
displaying a list of different possible positive patterns, the list corresponding to at least one of a specified measurement item or a specified labeling reagent;
receiving as a selection from the list at least one of the different possible positive patterns; and
displaying information of at least one of an abnormal cell count in the sample or a proportion of abnormal cells in the sample, based on the obtained bright point pattern and the selection from the list of at least one of the different possible positive patterns.

13. The fluorescence image analyzing method of claim 12, wherein the displaying the list of different possible positive patterns comprises displaying the list of different possible positive patterns, and check boxes arranged so as to provide user selection with a respective check box of different possible positive patterns from the list.

14. The fluorescence image analyzing method of claim 12, wherein the processing comprises:
managing, for each user, an authority for a particular user to operate a selection screen corresponding to that particular user that allows selection from among the list of different possible positive patterns; and
displaying the selection screen corresponding to the particular user having the authority.

15. The fluorescence image analyzing method of claim 12, further comprising storing a determination result for the cells included in the sample, wherein the processing comprises displaying the stored determination result.

16. The fluorescence image analyzing method of claim 12, wherein the displaying the information of at least one of the abnormal cell count in the sample or the proportion of the abnormal cells in the sample, comprises displaying the information together with the fluorescence image of the cells.

17. The fluorescence image analyzing method of claim 12, wherein the displaying the information of at least one of the abnormal cell count in the sample or the proportion of the abnormal cells in the sample comprises displaying a graph image indicating the proportion of the abnormal cells in the sample together with text information indicating the proportion of the abnormal cells in the sample.

18. The fluorescence image analyzing method of claim 12, wherein
the processing comprises displaying a determination result regarding a positive pattern for which the abnormal cells count in the sample is greatest, or the proportion of the abnormal cells in the sample is greatest, in a display manner different from that for a determination result regarding another positive pattern.

19. The fluorescence image analyzing method of claim 12, wherein
the list of different possible positive patterns are determined based on a color and a number of bright point of florescence.

20. The fluorescence image analyzing method of claim 12, wherein
the list of different possible positive patterns include a typical positive pattern and an atypical positive pattern.

21. The fluorescence image analyzing method of claim 12, further comprising receiving at least one of a selection of the specified measurement item indicative of a type of measurement or a selection of the specified labeling reagent indicative of a probe, and making the list of different possible positive patterns available for selection based on the selection of at least one of the specified measurement item or the selection of the specified labeling reagent.

* * * * *

UNITED STATES PATENT AND TRADEMARK OFFICE
CERTIFICATE OF CORRECTION

PATENT NO. : 11,521,315 B2
APPLICATION NO. : 16/831168
DATED : December 6, 2022
INVENTOR(S) : Momoko Imakubo Page 1 of 1

It is certified that error appears in the above-identified patent and that said Letters Patent is hereby corrected as shown below:

In the Claims

In Claim 1, Column 26, Line 30, delete "plurality of"

Signed and Sealed this
Third Day of January, 2023

Katherine Kelly Vidal
*Director of the United States Patent and Trademark Office*